US012228632B2

(12) United States Patent
Zhang et al.

(10) Patent No.: US 12,228,632 B2
(45) Date of Patent: Feb. 18, 2025

(54) RADIO FREQUENCY SENSING IN A VEHICULAR ENVIRONMENT

(71) Applicant: QUALCOMM Incorporated, San Diego, CA (US)

(72) Inventors: Xiaoxin Zhang, Sunnyvale, CA (US); Parthiban Ellappan, Virudhunagar (IN); Rishabh Raj, Jamshedpur (IN)

(73) Assignee: QUALCOMM INCORPORATED, San Diego, CA (US)

( * ) Notice: Subject to any disclaimer, the term of this patent is extended or adjusted under 35 U.S.C. 154(b) by 70 days.

(21) Appl. No.: 18/044,952

(22) PCT Filed: Sep. 21, 2021

(86) PCT No.: PCT/US2021/071537
§ 371 (c)(1),
(2) Date: Mar. 10, 2023

(87) PCT Pub. No.: WO2022/115813
PCT Pub. Date: Jun. 2, 2022

(65) Prior Publication Data
US 2023/0341535 A1    Oct. 26, 2023

(30) Foreign Application Priority Data
Nov. 27, 2020   (IN) .............................. 202041051702

(51) Int. Cl.
*G01S 13/04*   (2006.01)
*B60W 40/08*   (2012.01)
(Continued)

(52) U.S. Cl.
CPC ............. *G01S 13/04* (2013.01); *B60W 40/08* (2013.01); *B60W 50/14* (2013.01); *G01S 13/50* (2013.01);
(Continued)

(58) Field of Classification Search
CPC ........ G01S 13/04; G01S 13/50; B60W 40/08; B60W 50/14; B60W 2540/227; B60W 2540/043; B60W 2540/223
(Continued)

(56) References Cited

U.S. PATENT DOCUMENTS 9,024,814 B2 * 5/2015 Bangera ................. G06Q 30/02
                                                             342/175
9,865,150 B2 * 1/2018 Brankovi? ........... B60N 2/0023
(Continued)

FOREIGN PATENT DOCUMENTS

EP          3742195 A1   11/2020
WO   WO-2019122414 A1    6/2019

OTHER PUBLICATIONS

International Search Report and Written Opinion—PCT/US2021/071537—ISA/EPO—Mar. 25, 2022.
(Continued)

*Primary Examiner* — Zhen Y Wu
(74) *Attorney, Agent, or Firm* — Weaver Austin Villeneuve & Sampson LLP

(57) ABSTRACT

Embodiments described herein address these and other issues by providing radio frequency (RF) sensing to determine the status of a driver or other occupant of the vehicle. RF sensing may be provided by existing radios of a vehicle, such a Wi-Fi transceiver, and may therefore provide RF sensing functionality to a vehicle with little added cost. RF sensing can be leveraged to implement safety features such as detecting an unattended child or pet in a vehicle, detecting driver alertness, and the like.

24 Claims, 10 Drawing Sheets

(51) Int. Cl.
*B60W 50/14* (2020.01)
*G01S 13/50* (2006.01)

(52) U.S. Cl.
CPC . *B60W 2540/043* (2020.02); *B60W 2540/223* (2020.02); *B60W 2540/227* (2020.02)

(58) Field of Classification Search
USPC .................................................. 340/573.1
See application file for complete search history.

(56) References Cited

U.S. PATENT DOCUMENTS

| | | | |
|---|---|---|---|
| 12,036,948 B2* | 7/2024 | Mai | B60R 25/31 |
| 2004/0020314 A1* | 2/2004 | Tsuchihashi | G01S 13/56 340/459 |
| 2008/0036580 A1* | 2/2008 | Breed | B60N 2/66 340/438 |
| 2008/0157510 A1 | 7/2008 | Breed et al. | |
| 2014/0306799 A1 | 10/2014 | Ricci | |
| 2018/0194360 A1* | 7/2018 | Hill | B60W 50/14 |
| 2018/0237024 A1* | 8/2018 | Mummidi | G06N 5/04 |
| 2020/0064444 A1* | 2/2020 | Regani | G01S 7/006 |
| 2020/0238933 A1 | 7/2020 | Sobhany | |
| 2020/0290567 A1* | 9/2020 | Funyak | B60R 25/102 |
| 2020/0309932 A1 | 10/2020 | Zeng et al. | |
| 2020/0317207 A1* | 10/2020 | Sloushch | G01S 13/536 |
| 2020/0344522 A1* | 10/2020 | Scavo | H04N 21/44218 |
| 2020/0372782 A1* | 11/2020 | Yu | G08B 21/22 |
| 2020/0405223 A1* | 12/2020 | Mai | H04B 1/713 |
| 2020/0406860 A1* | 12/2020 | Mai | B60R 25/31 |
| 2021/0393128 A1* | 12/2021 | Chapman | A61B 5/0022 |
| 2022/0069860 A1* | 3/2022 | Park | G01S 7/006 |

OTHER PUBLICATIONS

Partial International Search Report—PCT/US2021/071537—ISA/EPO—Jan. 3, 2022.

* cited by examiner

RADIO FREQUENCY SENSING IN A VEHICULAR ENVIRONMENT

RELATED APPLICATIONS

This application is a U.S. National Stage Application of International Application No. PCT/US2021/071537, filed Sep. 21, 2021, entitled "RADIO FREQUENCY SENSING IN A VEHICULAR ENVIRONMENT", which claims the benefit of India Patent Application No. 202041051702 filed Nov. 27, 2020, entitled "RADIO FREQUENCY SENSING IN A VEHICULAR ENVIRONMENT", both of which are assigned to the assignee hereof, and incorporated by reference herein in their entirety.

BACKGROUND

1. Field of Invention

The present invention relates generally to object or motion detection, and more particularly, to the use of radiofrequency (RF) sensing of an object or motion.

2. Description of Related Art

With the ever-increasing sophistication of vehicle safety systems, vehicle owners today enjoy a level of safety and automation that was unavailable in vehicles of the past. Vehicles can employ a network of sensors to provide autonomous driving or semi-autonomous driving (e.g., driver supervised functionality like self-parking, lane assist, adaptive cruise control, etc.) and/or other Advanced Driver-Assistance Systems (ADAS). However, these new safety systems often employ cameras and corresponding image processing, which not only can increase the cost of these systems (putting them out of reach for many consumers), but also can raise privacy concerns for consumers.

BRIEF SUMMARY

Embodiments described herein address these and other issues by providing RF sensing to determine the status of a driver or other occupant of the vehicle. RF sensing may be provided by existing radios of a vehicle, such a Wi-Fi transceiver, and may therefore provide RF sensing functionality to a vehicle with little added cost. RF sensing can be leveraged to implement safety features such as detecting an unattended child or pet in a vehicle, detecting driver alertness, and the like.

An example method of RF sensing in a vehicle, according to this disclosure, comprises transmitting, with one or more wireless transceivers of the vehicle, a first set of RF signals. The method further comprises with the one or more wireless transceivers of the vehicle, a first set of reflected RF signals comprising reflections of the first set of RF signals from one or more objects, determining, from the received first set of reflected RF signals, first channel state information (CSI) of one or more wireless channels within the vehicle, determining status information based on the first CSI, wherein the status information comprises information regarding the status of an object within the vehicle, an area within the vehicle, or both, and providing a response based on the status information.

An example device for providing RF sensing in a vehicle, according to this disclosure, comprises one or more wireless transceivers, a memory, and one or more processors communicatively coupled with one or more wireless transceivers and the memory. The one or more processors are configured to transmit, via the one or more wireless transceivers, a first set of RF signals. The one or more processors are further configured to receive, via the one or more wireless transceivers, a first set of reflected RF signals comprising reflections of the first set of RF signals from one or more objects, determine, from the received first set of reflected RF signals, first CSI of one or more wireless channels within the vehicle, determine status information based on the first CSI, the status information comprising information regarding an object within the vehicle, an area within the vehicle, or both, and provide a response based on the status information.

An example RF sensing device for a vehicle, according to this disclosure, comprises means for transmitting a first set of RF signals, and means for receiving a first set of reflected RF signals comprising reflections of the first set of RF signals from one or more objects. The RF sensing device further comprises means for determining, from the received first set of reflected RF signals, first CSI of one or more wireless channels within the vehicle. means for determining status information based on the first CSI, the status information comprising information regarding an object within the vehicle, an area within the vehicle, or both, and means for providing a response based on the status information.

An example non-transitory computer-readable medium, according to this disclosure, has instructions stored thereby for RF sensing in a vehicle The instructions, when executed by one or more processors, cause the one or more processors to perform functions transmitting, with one or more wireless transceivers of the vehicle, a first set of RF signals. The instructions, when executed by one or more processors, further cause the one or more processors to perform functions including receiving, with the one or more wireless transceivers of the vehicle, a first set of reflected RF signals comprising reflections of the first set of RF signals from one or more objects, determining, from the received first set of reflected RF signals, first CSI of one or more wireless channels within the vehicle, determining status information based on the first CSI, the status information comprising information regarding an object within the vehicle, an area within the vehicle, or both, and providing a response based on the status information.

BRIEF DESCRIPTION OF THE DRAWINGS

Like reference symbols in the various drawings indicate like elements, in accordance with certain example implementations.

DETAILED DESCRIPTION

Figure 1:
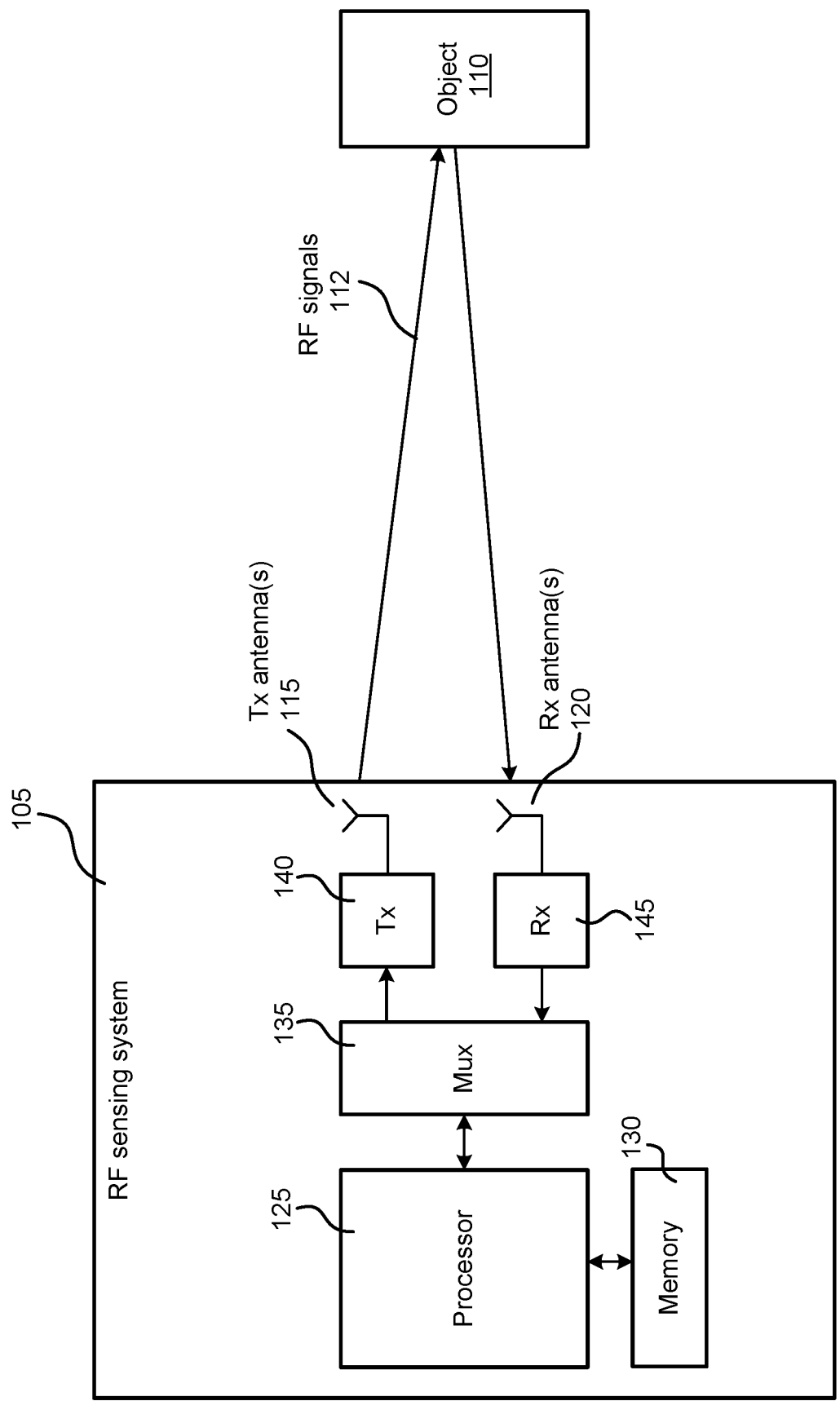
FIG. 1 is a block diagram of an example RF sensing system capable of performing RF sensing in a vehicle or environment.

The following description is directed to certain implementations for the purposes of describing the innovative aspects of this disclosure. However, a person having ordinary skill in the art will readily recognize that the teachings herein can be applied in a multitude of different ways. Some examples in this disclosure may be based on wireless local area network (WLAN) communication according to the Institute of Electrical and Electronics Engineers (IEEE) 802.11 wireless standards, including those identified as Wi-Fi technologies. However, the described implementations may be implemented in any device, system or network that is capable of transmitting and receiving radio frequency (RF) signals according to any communication standard, such as any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

As noted, RF signals can be used in RF sensing. RF signals with relatively high frequencies, such as 2.4 GHz, 5 GHz and 6 GHz commonly used in implementations of WLAN, have sufficiently small wavelengths to offer resolution capable detecting the presence of an object, identifying the object, and/or sensing motion within a vehicle. Moreover, such RF sensing can be implemented by existing Wi-Fi/IEEE 802.11/WLAN transceivers used for communications. Thus, it is possible to implement RF sensing with little or no added cost to vehicles with these types of existing transceivers, and may even be implemented to vehicles already in the field by means of a firmware update. That said, RF sensing may be achieved by additional or alternative transceivers. For example, according to some embodiments, ultra-wideband (UWB) transceivers can be used.

Figure 10:
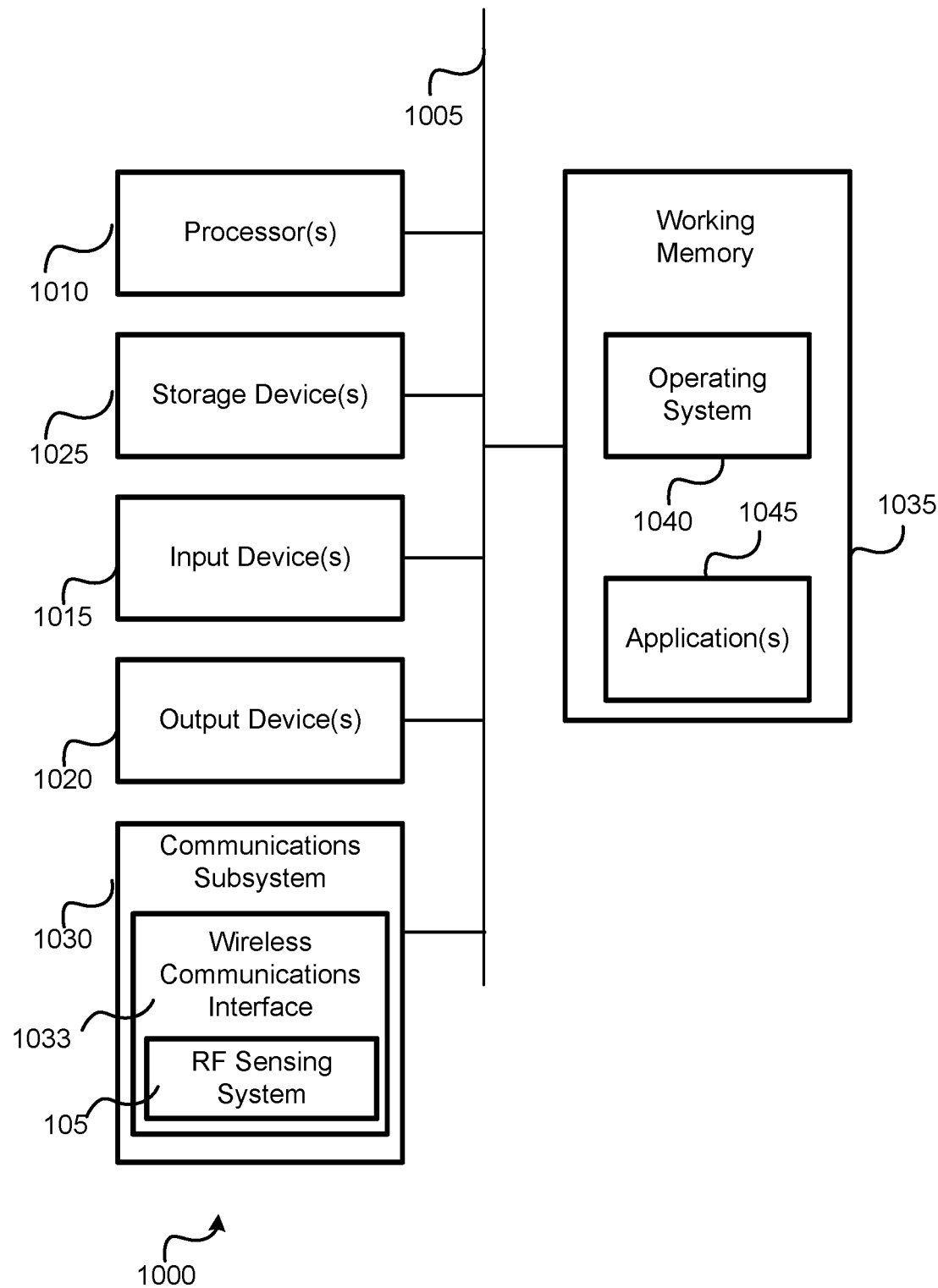
FIG. 10 is a block diagram of an embodiment of a computer system, which can be utilized in embodiments as described herein.

FIG. 1 is a block diagram of an example RF sensing system 105 capable of performing RF sensing in a vehicle or environment as described herein. In brief, the RF sensing system 105 uses RF signals comprising one or more waveforms, sequences, or packets to determine the presence and/or movement of an object. This can be done by using RF signals for channel capture to obtain a Channel Impulse Response (CIR), a Channel Frequency Response (CFR), and/or other forms of Channel State Information (CSI) indicative of the presence and/or movement of the object. The RF sensing system 105 may comprise a standalone device or may be integrated into a larger electronic device, such as a WLAN transceiver, UWB transceiver, vehicle computer, etc. (Example components of such a vehicle computer are illustrated in FIG. 10 and discussed in detail hereafter.) As noted in more detail below, some embodiments may be implemented such that RF signals are transmitted by one device and received by another.

Generally speaking, with regard to the functionality of the RF sensing system 105 in FIG. 1, the RF sensing system 105 can detect an object 110 by generating a RF signals 112 (e.g., comprising one or more pulses) transmitted by one or more Tx antennas 115 that reflect off of the object 110 and are received by one or more Rx antennas. The received signals can then be processed by the RF sensing system 105 using digital signal processing (DSP) techniques (including leakage cancellation) to determine the object's range. Moreover, in some embodiments, an RF sensing system 105 may have a plurality of Rx antennas 120. (WLAN radios, for example, commonly have 2 to 4 antennas.) In such embodiments, CSI received at different Rx antennas 120 can be used to determine angular information (e.g., by using Rx beamforming, determining angular information phase differences, or the like). In some implementations, embodiments with two antennas have achieved angular granularity of 10° to 15°, for example, and embodiments with four antennas have achieved granularity of 2° to 3°. Moreover, in some other embodiments, an RF sensing system 105 may have a plurality of Tx antennas 115. (WLAN radios, for example, commonly have 2 to 4 antennas.) In such embodiments, the phase of the Tx antennas can be configured to transmit the RF signals 112 in a beam pointing at a certain direction. In some implementations, embodiments with two Tx antennas have achieved angular granularity of 10° to 15°, for example, and embodiments with four Tx antennas have achieved granularity of 2° to 3°. Changes in CSI over time are indicative of motion of the object 110. Thus, RF signals can be used to determine object location, volume, and movement.

This functionality of the RF sensing system 105 is enabled through the use of a processor 125, memory 130, multiplexer (mux) 135, Tx processing circuitry 140, and Rx processing circuitry 145. (The RF sensing system 105 may include additional components not illustrated, such as a power source, user interface, or electronic interface.) It can be noted, however, that these components of the RF sensing system 105 may be rearranged or otherwise altered in alternative embodiments, depending on desired functionality. Moreover, as used herein, the terms "transmit circuitry," "Tx circuitry," or "Tx processing circuitry" refer to any circuitry utilized to create and/or transmit RF signals 112. Likewise, the terms "receive circuitry," "Rx circuitry," or "Rx processing circuitry" refer to any circuitry utilized to detect and/or process the RF signals 112. As such, "transmit circuitry" and "receive circuitry" may not only comprise the Tx processing circuitry 140 and Rx processing circuitry 145 respectively, but may also comprise the mux 135 and processor 125. In some embodiments, the processor 125 may compose at least part of a modem and/or wireless communications interface (e.g., wireless communications interface 1033 of FIG. 10, described hereinafter). In some embodiments, more than one processor may be used to perform the functions of the processor 125 described herein. Additionally, although Tx antenna(s) 115 and Rx antenna(s) 120 are illustrated as being separate antennas, some embodiments may use the same one or more antennas for transmission and reception.

The Tx processing circuitry 140 and Rx processing circuitry 145 may comprise subcomponents for respectively generating and detecting RF signals. As a person of ordinary skill in the art will appreciate, the Tx processing circuitry 140 may therefore include a pulse generator, digital-to-analog converter (DAC), a mixer (for up-mixing the signal to the transmit frequency), one or more amplifiers (for powering the transmission via Tx antenna(s) 115), etc. The Rx processing circuitry 145 may have similar hardware for processing a detected RF signal. In particular, the Rx processing circuitry 145 may comprise an amplifier (for amplifying a signal received via Rx antenna(s) 120), a mixer for down-converting the received signal from the transmit frequency, an analog-to-digital converter (ADC) for digitizing the received signal, and a pulse correlator providing a matched filter for the pulse generated by the Tx processing circuitry 140. The Rx processing circuitry 145 may therefore use the correlator output as the CIR, which can be processed by the processor 125 (or other circuitry) for leakage cancellation, for example. Other processing of CSI obtained from the RF signals 112 may also be performed, such as object detection, range, motion, direction of departure (DoD) or direction of arrival (DoA) estimation.

It can be noted that the properties of the transmitted RF signal 112 may vary, depending on the technologies utilized. As noted, techniques provided herein can apply to WLAN technologies, which typically operate at 2.4, 5, and 6 GHz, but may include frequencies ranging from 900 MHz to 60 GHz. This includes, for example, frequencies utilized by the 802.11ad Wi-Fi standard (operating at 60 GHz). That said, some embodiments may utilize RF frequencies outside this range. Because RF sensing may be performed in the same frequency bands as communication, hardware may be utilized for both communication and RF sensing. For example, one or more of the components of the RF sensing system 105 shown in FIG. 1 may be included in a wireless modem (e.g., Wi-Fi or 5G modem) of a vehicle. That said, embodiments may utilize an RF sensing system 105 independent of any such communication means. As noted, for example, some embodiments may utilize UWB transceivers. Technics for RF sensing described may utilize various types of RF signals 112, such as Zadoff sequences, Orthogonal Frequency-Division Multiplexing (OFDM) Long Training Field (LTF)-like symbols for channel capture to determine the presence and/or movement of the object 110. Because the RF sensing system may be capable of sending RF signals for communication (e.g., using 802.11 communication technology), embodiments may leverage channel estimation used in communication for performing RF sensing as provided herein. Accordingly, RF signals 112 may comprise the same wireless pulses and/or packets as those used for channel estimation in communication.

Figure 2:
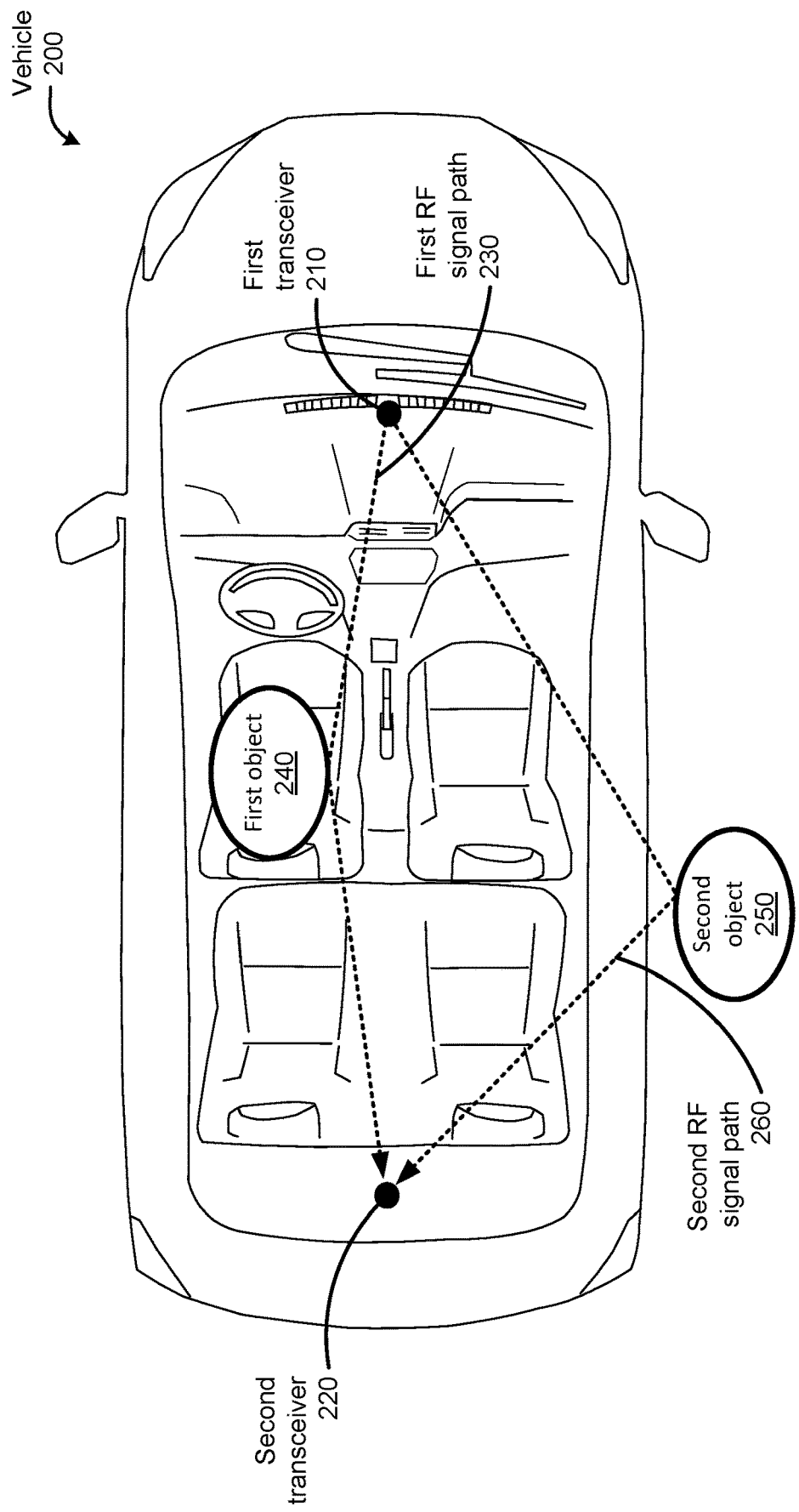
FIG. 2 is an overhead cutaway view of a vehicle, illustrating how RF sensing may be used in a vehicular environment to detect an object or movement inside the vehicle, according to an embodiment.

FIG. 2 is an overhead cutaway view of a vehicle 200, illustrating how RF sensing may be used in a vehicular environment to detect an object or movement inside the vehicle 200, according to an embodiment. Here, a first transceiver 210 (which may comprise an RF sensing system 105) may transmit RF signals, received by a second transceiver 220. A processor or computer communicatively coupled with the first transceiver 210 and second transceiver 220 may coordinate the timing of the transmittal and receipt of the RF signals. (The first transceiver 210 and second transceiver 220 may be communicatively linked with and/or incorporated into a vehicle computer, such as the one illustrated in FIG. 10 and described in more detail below.) Portions of the RF signals that travel along a first RF signal path 230 reflect off a first object 240. As previously noted, these reflections may be identified in the captured CSI and used to determine a location of the first object 240 and/or larger motion of the first object 240 (e.g., a person moving their head/arm movement or shifting in their seat). Moreover, CSI of RF signals having multiple spatial streams and/or relatively high bandwidth can be used to determine smaller motions (e.g., breathing) and/or finer detail indicative of additional details, such as a state of the object 240 (e.g., alert, breathing, etc., as discussed in more detail below).

The determination of the presence of the first object 240 in the vehicle 200 and differentiation of the first object 240 with objects outside the vehicle 200 (such as object 250) may be achieved, in part, through calibration and filtering. For example, a manufacturer of the vehicle 200 may calibrate the first transceiver 210 and second transceiver 220 such that reflections of RF signals from vehicle parts (e.g., seats, steering wheel, etc.) are ignored. In the field, differences in reflections of RF signals can then be compared with those in the initial calibration to identify the presence of objects.

Figure 3A:
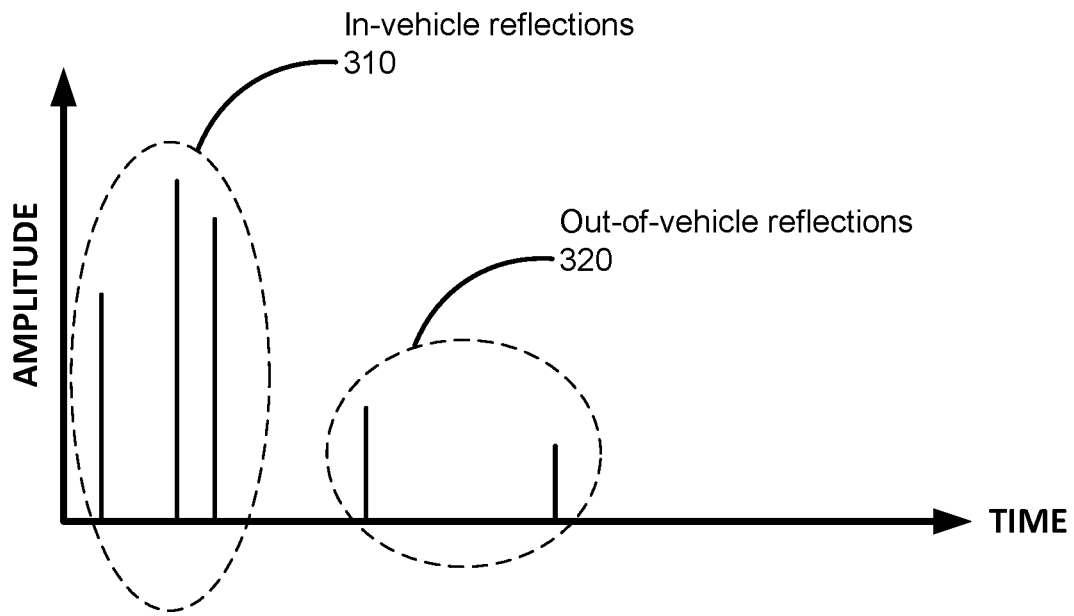
FIGS. 3A and 3B are simplified diagrams of captured Channel State Information (CSI), illustrating how thresholds may be used to distinguish reflections from inside a vehicle from those outside the vehicle.
Figure 3B:
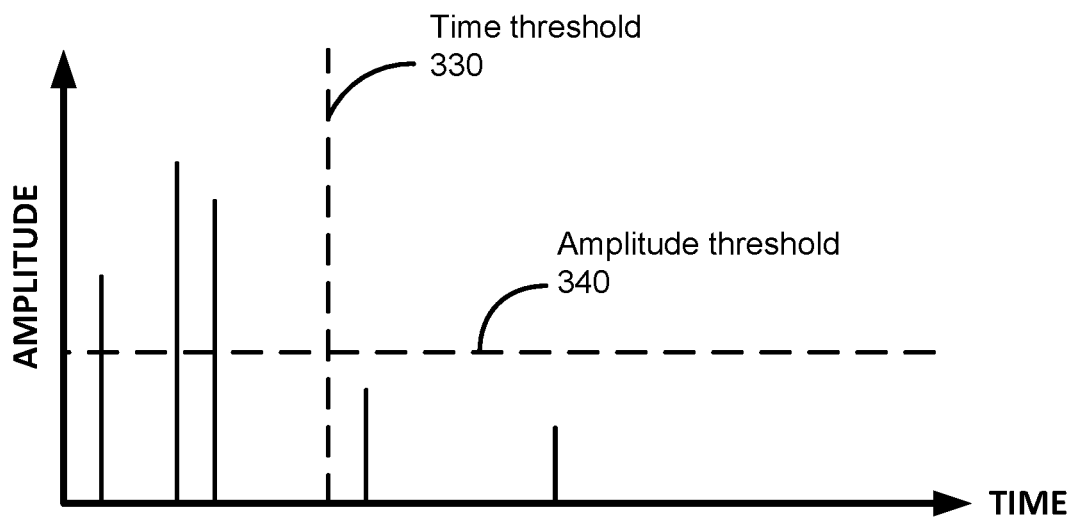

Further, reflections from objects outside the vehicle 200 can be filtered using time and/or amplitude thresholds. For example, reflections from a second object 250 from RF signals travel along the second RF signal path 260, which is longer than the first RF signal path 230. As such, reflections from the second object 250 are received by the second transceiver 220 after the reflections from the first object 240. This is generally true for all objects outside the vehicle versus objects inside the vehicle. Additionally, because first transceiver 210 and a second transceiver 220 may be located inside the vehicle, reflections received by the second transceiver 220 that travel along the second RF signal path 260 may have a reduced amplitude due to traveling through windows and/or other vehicle components and materials to exit and re-enter the vehicle 200. This can result in a lower Received Signal Strength Indicator (RSSI) measurement for reflections coming from objects outside the vehicle 200. FIGS. 3A and 3B illustrate this point further.

FIGS. 3A and 3B are simplified diagrams of captured CSI, illustrating how thresholds may be used to distinguish reflections from inside a vehicle from those outside the vehicle. The amplitude of RF signals received (e.g., at a second transceiver 220 from a first transceiver 210) can be extracted from the CSI (e.g., the channel impulse response) and plotted over time, as illustrated in FIG. 3A. Further, as previously noted, calibration and leakage mitigation techniques can account for leakage (direct, non-reflected signals) and reflections from seats and other vehicle parts. The reflections illustrated in FIG. 3A therefore may represent one or more objects in the vehicle, such as cargo and vehicle users (e.g., driver and/or passengers), and/or one or more objects outside the vehicle. As previously noted, in-vehicle reflections 310 (illustrated as spikes in amplitude) from objects inside the vehicle are received earlier than out-of-vehicle reflections 320 from objects outside the vehicle.

Additionally, the amplitude of the out-of-vehicle reflections 320 is lower than that of the in-vehicle reflections 310.

This can provide for a relatively easy way in which RF signals may be processed to remove or ignore out-of-vehicle reflections 320. As illustrated in FIG. 3B, which replicates the graph of FIG. 3A with additional thresholds, a time threshold 330 and/or amplitude threshold 340 can be implemented to distinguish between the out-of-vehicle reflections 320 and in-vehicle reflections 310. These thresholds may vary, based on vehicle type, transceiver power, and other such factors. Moreover, because there may be no single amplitude value and/or time value at which the amplitude threshold 340 and time threshold 330 may be respectively set to reliably filter out all out-of-vehicle reflections 320, these thresholds may be set add values to filter out most out-of-vehicle reflections 320. Thus, according to some embodiments, vehicle manufacturers may set one or both of the time threshold 330 and amplitude threshold 340 at values for a certain vehicle or certain vehicle type that help maximize the capture of in-vehicle reflections 310 and further maximize the filtering of out-of-vehicle reflections 320.

Although some embodiments may use a single threshold to make the distinction, the utilization of both thresholds may be complementary. That is, reflections from some objects internal to a vehicle may be reduced in amplitude (e.g., due to the composition of the objects) and may therefore not meet an amplitude threshold 340 sets to filter out most out-of-vehicle reflections 320. Similarly, reflections from some objects close to the vehicle, but outside the vehicle, may meet a time threshold 330 set to filter out most out-of-vehicle reflections 320. Accordingly, some embodiments may filter reflections that only fail to meet both amplitude threshold 340 and time threshold 330. Additionally or alternatively, additional thresholds may be used. For example, and additional time threshold may be used whereby, if a reflection fails falls after the time threshold 330, but prior to the additional time threshold, it may be not be filtered out if it meets the amplitude threshold 340. All reflections that fall after the additional threshold, however, may be filtered out. Other embodiments may employ additional or alternative thresholds to perform additional types of filtering in this manner.

It can be noted that some embodiments may utilize machine learning to performs the RF signal processing as described herein. For example, machine learning algorithms may be used to determine optimal values for the time threshold 330 and/or amplitude threshold 340, or equivalently perform the filtering described in FIGS. 3A and 3B. Moreover, as indicated in more detail hereafter, machine learning may be used to process the in-vehicle reflections 310 for to detect objects, identify objects, and/or identify motion.

Figure 4:
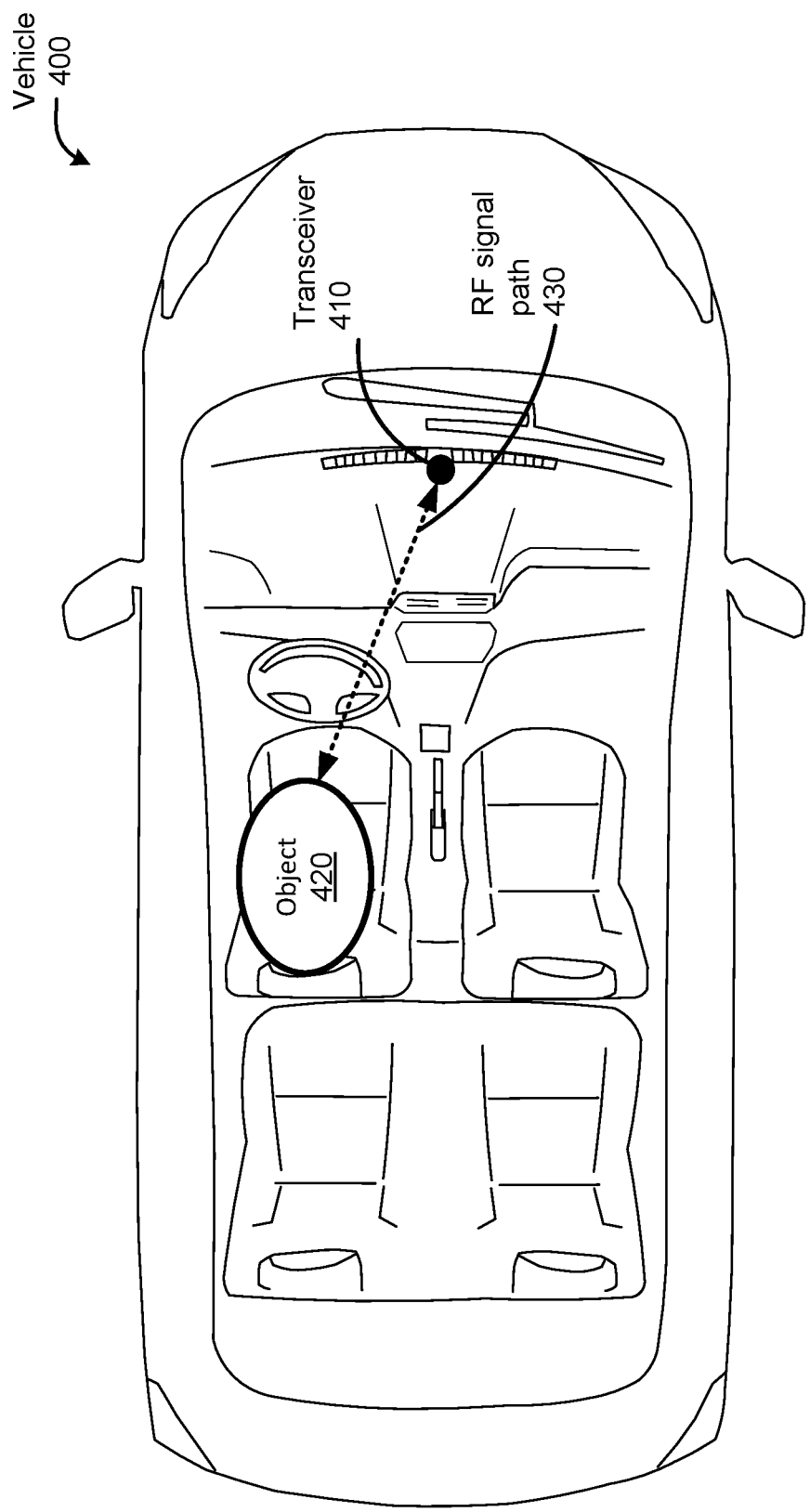
FIG. 4 is an overhead cutaway view of a vehicle, similar to FIG. 2, illustrating how RF sensing may be performed according to another embodiment.

FIG. 4 is an overhead cutaway view of a vehicle 400, similar to FIG. 2, illustrating how RF sensing may be performed according to another embodiment. Here, rather than having separate transceivers, the vehicle 400 has a single transceiver 410. In this embodiment, the transceiver 410 may comprise an RF sensing system 105 and may perform the functions of both first transceiver 210 and second transceiver 220 of FIG. 2, transmitting and receiving RF signals, and processing RF signals reflected off of an object 420 in the vehicle 400 that travel along RF signal path 430. As a person of ordinary skill in the art will appreciate, because the transceiver 410 may perform both transmit and receive functions at the same time, the transceiver 410 may have to implement leakage mitigation and/or similar algorithms to help minimize interference between the transmit and receive functions.

The ability to perform RF sensing in the manner previously described and illustrated in FIGS. 1-4 can enable a vehicle to provide functionality related to object detection and/or movement detection within the vehicle that may otherwise require cameras, which are not only more expensive, but may also compromise the privacy of vehicle users.

One such function is vehicle occupant detection. When a child or pet is left in a vehicle—intentionally or unintentionally—by the driver, the health and safety of the child or pet may be compromised by temperature conditions within the vehicle. However, RF sensing can be used to detect and optionally identify a vehicle occupant, and measures can be taken to help ensure the safety of the occupant. More broadly, RF sensing can be used to detect an object and/or motion in the vehicle and provide an alert regarding the detected object/motion.

Figure 5:
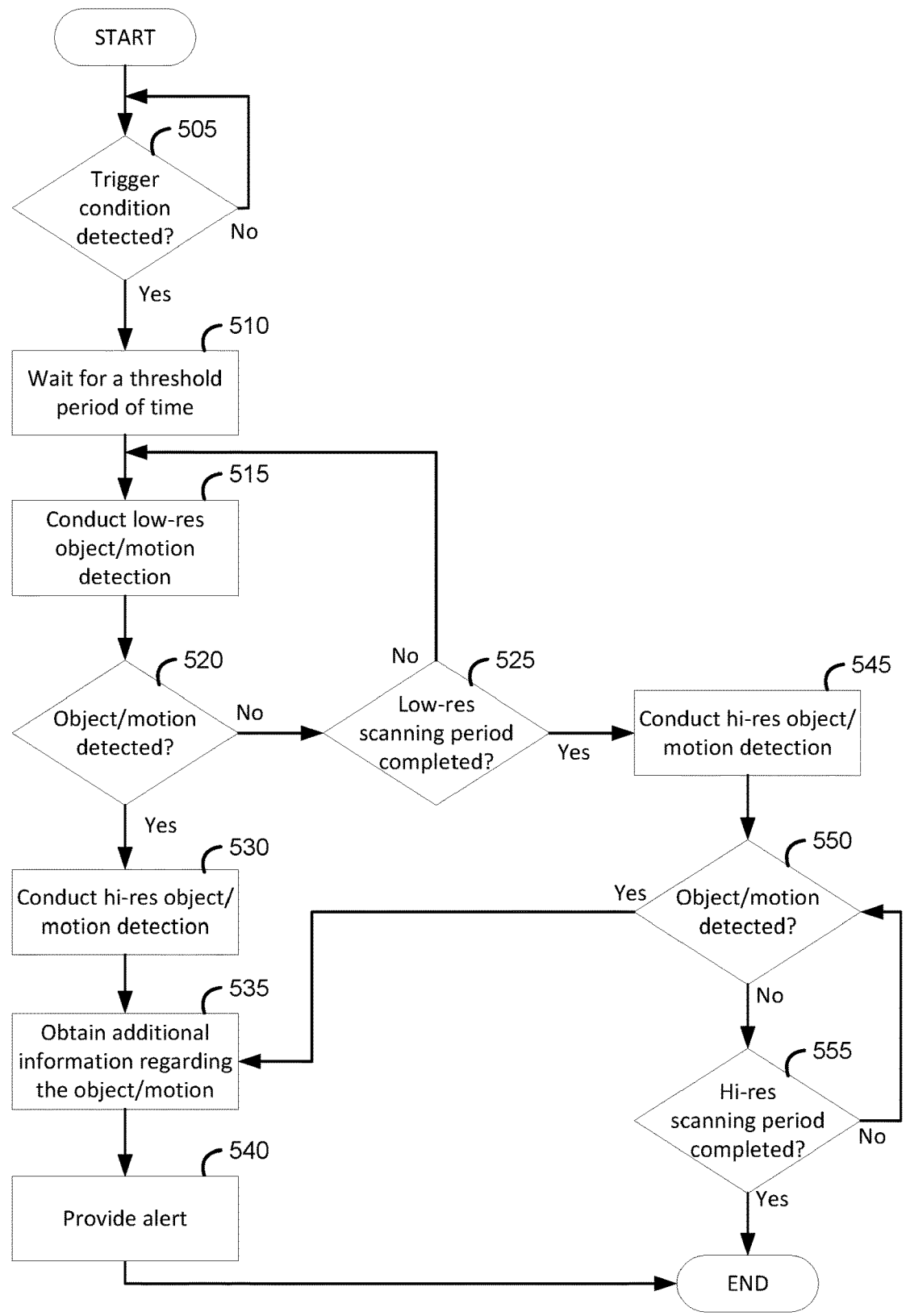
FIG. 5 is a flowchart illustrating a process of detecting an object and/or motion in a vehicle and providing an alert, according to an embodiment.

FIG. 5 is a flowchart illustrating a process of detecting an object and/or motion in a vehicle and providing an alert, according to an embodiment. As with other figures provided herein, FIG. 5 is provided as a non-limiting example. Alternative embodiments may add, omit, rearrange, and/or otherwise alter the operations illustrated in FIG. 5. Moreover, although the process illustrated in FIG. 5 is described below with regard to detection of an occupant (e.g., child or pet) left in a vehicle, alternative embodiments may employ similar processes to detect other things, including packages or other cargo, occupied or unoccupied seats (e.g., within a bus, train, passenger vehicle, etc.), or the like. Further, embodiments are not limited to detecting a single occupant. Multiple occupants may be detected and (optionally) the number of occupants may be determined. The RF sensing provided in the process illustrated in FIG. 5 may be provided by an RF sensing system, such as the one illustrated in FIG. 1, which can be used in one or more wireless transceivers as illustrated in FIGS. 2 and 4. The implementation of the process illustrated in FIG. 5 may be performed by a vehicle computer, such as the computer system illustrated in FIG. 10 and described hereafter. Additionally, it can be noted that although the description herein describes the detection of "an object" embodiments are not so limited. According to some embodiments, multiple objects and/or objects types may be detected and/or identified using the techniques provided herein.

It can also be noted that embodiments are not necessarily limited to detecting a child, pet, or inanimate object (e.g., cargo). Some embodiments may also detect an adult vehicle occupant. Embodiments may further distinguish between a child and an adult (e.g., based on difference in size, an identification of the person, etc.), and may respond differently. A detected adult, for example, may not trigger a message/alert, or they simply trigger a message with no further warning/alert as described hereinafter. In some embodiments, the type of messaging/alert may be configurable, such that a vehicle user may select a type of alert/message to receive based on a detected object type (e.g., child, adult, pet), or an identity of a detected person/pet.

The process may begin at block 505, where a determination is made of whether a trigger condition has been detected. The trigger condition may comprise any of a variety of conditions, depending on the application. Embodiments involving detecting a child or pet left in the vehicle, for example, the trigger condition may be a determination that the vehicle has been turned off, the key has been removed from the vehicle, a fob is no longer detected within the vehicle, and/or the driver or other vehicle users have left the vehicle.

According to some embodiments, a trigger condition may comprise a driver and/or other vehicle user exiting or entering an area within a threshold distance of the vehicle. According to some embodiments, this distance may be defined as a distance within which a vehicle may engage in peer-to-peer (P2P) communications with a user device (e.g., the user's mobile phone). In various 5G and legacy cellular standards, these P2P communications may be referred to as device-to-device (D2D) communications, sidelink communications, and/or communications via a Uu interface. For example, a vehicle can determine whether a user is within a threshold distance of the vehicle by determining whether it can engage with P2P communications with the user's mobile device. Accordingly, one such triggering event can be determining a user is no longer within a threshold distance of the vehicle by determining the vehicle is no longer able to communicate with the user's mobile device via a P2P connection.

Other embodiments may have other trigger conditions, which may vary depending on vehicle type. Passenger vehicles, for example, may have different trigger conditions than transit or other commercial vehicles. Embodiments for passenger vehicles may involve using RF sensing for detecting cargo in a cargo area (e.g., trunk, pickup truck bed, etc.), for example, in which case the trigger condition may comprise detecting that a driver or other vehicle user has entered and/or exited the vehicle. Other embodiments may simply involve detecting passengers in the vehicle, in which case the trigger condition may comprise detecting the opening and/or closing of a vehicle door or window.

For commercial vehicles, RF sensing may be used for detecting cargo or available space in a cargo area (including specific locations within a cargo area), for example, in which case the trigger condition may comprise detecting a driver or other vehicle user has entered and/or exited the vehicle, detecting the vehicle has arrived at a delivery location, detecting the vehicle is within a threshold time or distance from the delivery location, receiving a cargo status request (e.g., from a remote device), etc. The determination of available space in a delivery truck, for example, could allow for instances in which a consumer uses a mobile phone application to in communication with the vehicle to change in order from in-store pickup to delivery based on availability in the trunk as determined through RF sensing. Alternatively, the vehicle could notify a customer once cargo space is available for a desired item for delivery. For transit vehicles, including rideshare vehicles, RF sensing may be used to determine occupied/unoccupied seats, etc. Trigger conditions in these embodiments may comprise detecting the opening and/or closing of a vehicle door or window, arriving at a point of interest (POI) (e.g., bus stop, train station, etc.), passing within a threshold distance of a POI, passing within a threshold time of arriving at a POI, receiving a pickup request (e.g., from a mobile device application of a consumer), etc. Trigger conditions from consumer requests could not only trigger an RF sensing scan to determine whether there is availability on a rideshare other transit vehicle, based on a request from the consumer (e.g., using a mobile device application), but could also trigger an RF sensing scan for a lost item if a consumer believes they left an item on a vehicle.

Implementing the operation at block 505 may involve the use of one or more vehicle sensors and/or systems other than the RF sensing system. This can include, for example, sensors to detect the presence of a key in the vehicle's ignition or fob inside the vehicle, seat and/or door sensors to detect the opening and/or closing of a door and/or the presence of a vehicle user in a seat. Other vehicle sensors additionally or alternatively may be used.

At block 510, the process involves waiting for threshold period of time. Embodiments involving detecting a child or pet left in the vehicle, for example, may wait for a threshold period of time before employing RF sensing to determine whether a pet or child is left in the vehicle. This can, for example, account for cases in which a driver leaves the vehicle to open a passenger door to assist the child or pet in leaving the vehicle. Longer periods of time can account for cases in which a driver may exit the vehicle momentarily. As such, according to some embodiments, this threshold may range between less than one minute to several minutes. Other embodiments may have a threshold outside this range. Depending on desired functionality, some embodiments may allow for adjustment of this threshold period of time, allowing car manufacturers or even consumers to adjust the threshold. Additionally or alternatively, embodiments may adjust this threshold based on sensor and/or other information regarding the vehicle and/or environmental factors (e.g., using a short threshold time period if temperatures are outside a safe range of temperatures for human or pet occupants, and using a longer threshold time period if temperatures are within the safe range).

At block 515, the functionality comprises conducting low-resolution ("low-res") object/motion detection. This low-resolution form of detection may involve capturing CSI with a relatively low frequency (e.g., a periodicity of 100 ms, 500 ms, 1 s, etc.), relatively low bandwidth (e.g., 20 or 40 MHz), and/or relatively few spatial streams (e.g., a single spatial stream). For embodiments, such as those involving detecting a child or pet left in the vehicle, which the process of FIG. 5 may occur when the vehicle is powered off, the preliminary use of low-resolution in this manner can help ensure low power used to help meet stringent power consumption requirements of auto manufacturers when a vehicle is turned off. This low-resolution detection can be used preliminarily to detect an object or motion in the vehicle. Additional information regarding the motion and/or object can be obtained using a subsequent high-resolution ("hi-res") object/motion detection, as described hereinafter.

The functionality at block 525 comprises determining whether a low-resolution scanning period is completed. If not, the process can involve continuing the low-resolution object/motion detection until the low-resolution scanning period is completed, or until an object or motion is detected. The length of the low-resolution scanning period may vary, depending on desired functionality. According to some embodiments, this period may last from 2-5 minutes, although other embodiments may use periods outside this range. According to some embodiments, this time period may be configurable by an auto manufacturer or even a consumer. Again, embodiments may also adjust this time period based on sensed temperature and/or other environmental factors.

If an object or motion is detected, the process can move to block 530, where high-resolution object/motion detection is performed. In high-resolution detection, CSI may be captured at a relatively high frequency (e.g., a periodicity of 1 ms, 2 ms, etc.) etc.), relatively high bandwidth (e.g., 80 or 160 MHz), and/or an increased number of spatial streams (e.g., two or more) relative to the number used in low-resolution detection. As previously noted, this increased capability (relative to low-resolution detection) can increase the spatial and/or temporal resolution of RF sensing, allowing the vehicle to obtain additional information regarding the object and/or motion, as indicated at block 535.

Depending on desired functionality, this additional information may vary. It can include, for example, determining a location of the motion and/or object, identifying a motion type (e.g., breathing, arm movement, movement to a different location within the vehicle, etc.), identifying an object type (e.g., an adult, a child, or pet, etc.), identifying a particular object (e.g., a particular person or pet), and object orientation/pose (e.g., sitting, laying down, etc.), and/or the like.

Identifying a particular object may involve comparing detected aspects of the object with those stored in memory. For example, according to some embodiments, a vehicle may create and store user profiles including data regarding user dimensions, breathing patterns, and/or other detectable user aspects, which can be later used to determine the identity of the vehicle user. Such embodiments may involve a training process in which an authorized user is able to add a new user profile via a user interface of the vehicle, which may be initiated by the authorized user and/or prompted by the vehicle (e.g., upon detecting a new, unrecognized vehicle user via RF sensing). A training mode may then be executed in which RF sensing is used to scan the new user at one or more locations within the vehicle to determine the new user's dimensions and/or breathing patterns, which can be stored in the user profile of the new user. As noted, when subsequently performing RF sensing (e.g., the high-resolution object/motion detection at block 530), any detected motion and/or object can be compared with user dimensions and/or breathing patterns to identify a vehicle user.

Returning to the process illustrated in FIG. 5, an alert may then be provided, as illustrated at block 540. Depending on desired functionality, the type of alert provided may vary, as may the way in which the alert is provided. Moreover, the type of alert may vary based on other factors (e.g., temperature conditions) as described in more detail below.

Figure 6:
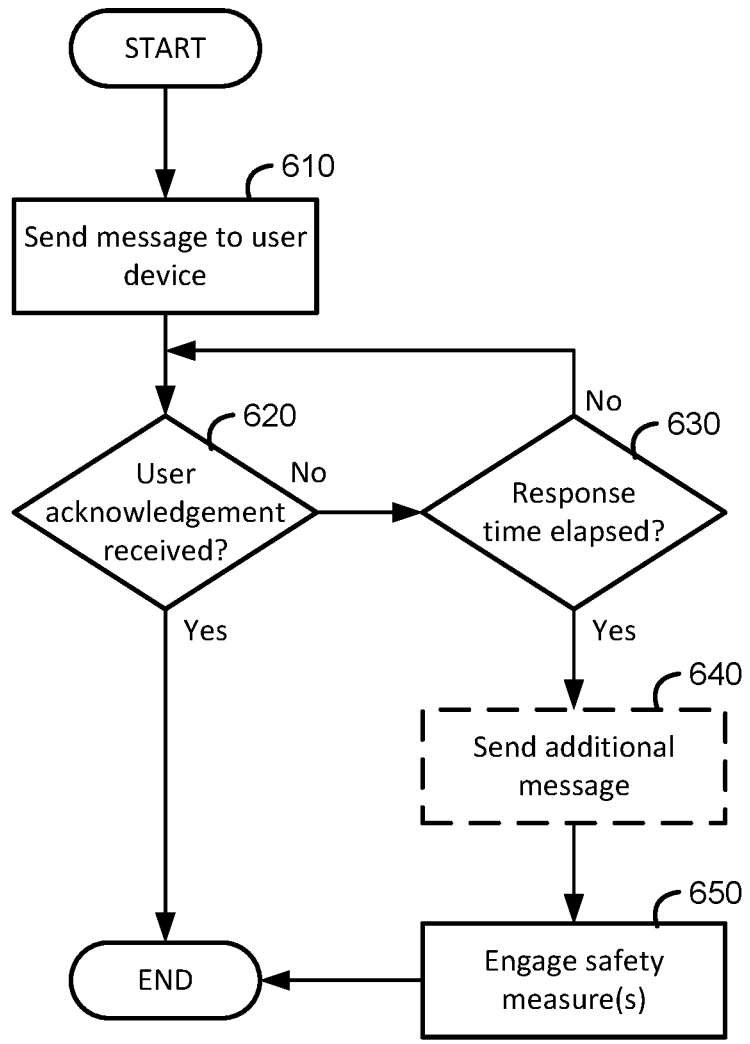
FIG. 6 is a flow chart that illustrates a process of providing an alert in an embodiment in which a child or pet is determined to be left in the vehicle.

FIG. 6 is a flow chart that illustrates a process of providing an alert in an embodiment in which a child or pet is determined to be left in the vehicle. Here, the process may begin at block 610, where a message is sent to a user device. The message may comprise a text, for example, sent to a user's mobile phone. Additionally or alternatively, a message may be sent to the user's mobile phone via an application on the mobile phone (e.g., an application related to the vehicle for vehicle owners). This message may be conveyed via any combination of public and/or private communication networks, including the Internet. Such an application could allow for additional functionality, such as displaying an urgent message on a screen of the user's mobile phone and/or playing an audio message and/or sounding an audio alert.

The content of the message may vary, depending on desired functionality. In some embodiments, for example, it may simply indicate the presence of a detected object in the vehicle. In other embodiments, the message may further convey information regarding the status of the vehicle (e.g., whether doors are locked, internal temperature, etc.), a type of object detected (e.g., a child or pet), and/or an identity of the detected object (e.g., a name of the child or pet).

The functionality at blocks 620 and 630 provide for determining whether a user acknowledgment is received within a response time. The response time can be balanced such that a user is given sufficient time to provide an acknowledgment (e.g., by sending a response text, pressing a button on a mobile device's touchscreen, etc.), while bearing in mind the safety of the of the child or pet in the vehicle. As with other time thresholds, this time may be set by a car manufacturer or consumer.

Additionally or alternatively, this time may be dependent, at least in part, on conditions at the vehicle. For example, if a thermometer or other temperature sensor at the vehicle indicates the temperature in the vehicle is at unsafe levels (e.g., outside range of temperatures deemed safe for children and/or pets) this time may be shortened. Moreover, according to some embodiments, the length of the response time may be proportional to the degree to which a measured temperature is outside safe levels, such that temperatures far outside the range of safe temperatures result in much shorter response times.

Depending on desired functionality, additional messages may be provided to further prompt a response from the user. Accordingly, the functionality at block 640 indicates an additional message is optionally sent to the user. Follow-up messages may be sent in a different manner and/or with different urgency/priority. An initial message, for example, may be sent as a regular text, whereas any follow-up messages may be sent with additional urgency (e.g., a telephone call, a sound or other audio notification, etc.), which may be dependent on whether the user has an application installed on the user's mobile phone (or other device configured to receive the message sent from the vehicle).

If an acknowledgment is not received within the response time, additional safety measures may be taken, as indicated at block 650. These safety measures may involve, for example, lowering a window of the vehicle, activating a heating or cooling system of the vehicle, unlocking a door of the vehicle, and/or activating and alarm at the vehicle. In some cases, this may involve starting the vehicle and activating one or more systems of the vehicle. The type of safety measure may be dependent on the status of the vehicle, to help resolve or mitigate any safety issues for the child or pet left in the vehicle. A heating system of the vehicle, for example, may be engaged if the internal temperature of the vehicle is measured to be below a certain threshold, whereas an air-conditioning system of the vehicle may be engaged if the internal temperature is above a certain threshold. One or more windows may be rolled down based on a difference between internal and external temperatures at the vehicle. A panic alarm (e.g., involving flashing lights, honking the horn, and/or sounding and audio alarm) may be engaged in some cases, such as situations in which urgent attention might be needed to help ensure the safety of the child or pet left in the vehicle. In some embodiments and/or scenarios, a panic alarm may be engaged in addition to taking other safety measures. Additionally or alternatively, in some embodiments, the vehicle may be able to contact emergency services.

As indicated in FIG. 6, the process may end if the user acknowledgment is received. In some embodiments, a user may be able to provide additional instructions to the vehicle for safety measures to be taken. That is, a user may be able to indicate (e.g., by responding to a text, interacting with the user interface of a mobile phone application, etc.) one or more safety measures for the vehicle to take to help ensure the safety of the vehicle occupant.

Returning to FIG. 5, if no motion is detected within a low-resolution scanning period (the operations at blocks 520 and 525) a high-resolution object/motion detection can still be conducted, as indicated at block 545. This can be done to detect certain motions, such as breathing, that may not be detectable using low-resolution detection, to help ensure the accuracy of object/motion detection.

As the operations at blocks 550 and 555 indicate, high-resolution object/motion detection may be conducted during high-resolution scanning period. Similar to the low-resolution scanning period, this period of time may be configurable. Again, because power usage may be a concern, this period of time may be limited to less than a minute, for example, to help ensure limited power usage. If no object is detected, the process can and, as indicated in FIG. 5. Otherwise, if an object or motion is detected, the process can proceed to the functionality of block 535 and continue as previously described.

As previously indicated, to help identify vehicle users, a vehicle may implement a profile system in which user data is stored by the vehicle. This data may be stored, for example, in a memory of a vehicle computer, an example of which is illustrated in FIG. 10 and described hereinafter. Moreover, according to some embodiments, profiles of vehicle users may be updated over time to help ensure accurate user detection and account for changes of the users (e.g., a child or pet growing over time). Such updates may be implemented automatically, and/or manually by an authorized user (e.g., owner of the vehicle).

According to some embodiments, the user profile system may be leveraged to implement driver-specific settings and/or customizations within the vehicle. For example, upon sensing a driver has entered the vehicle (e.g., based on fob location and/or driver seat sensors or when a key is inserted into the vehicle, etc.), the vehicle may use RF sensing as described herein to detect user dimensions and/or breathing patterns, which can be compared to user dimensions and/or breathing patterns of a stored vehicle user profile to identify the user. Once identified, the vehicle may restore saved user settings for the identified driver (e.g., seat location, mirror alignment, pedal location, radio presets and/or other user interface customizations, etc.).

Figure 7:
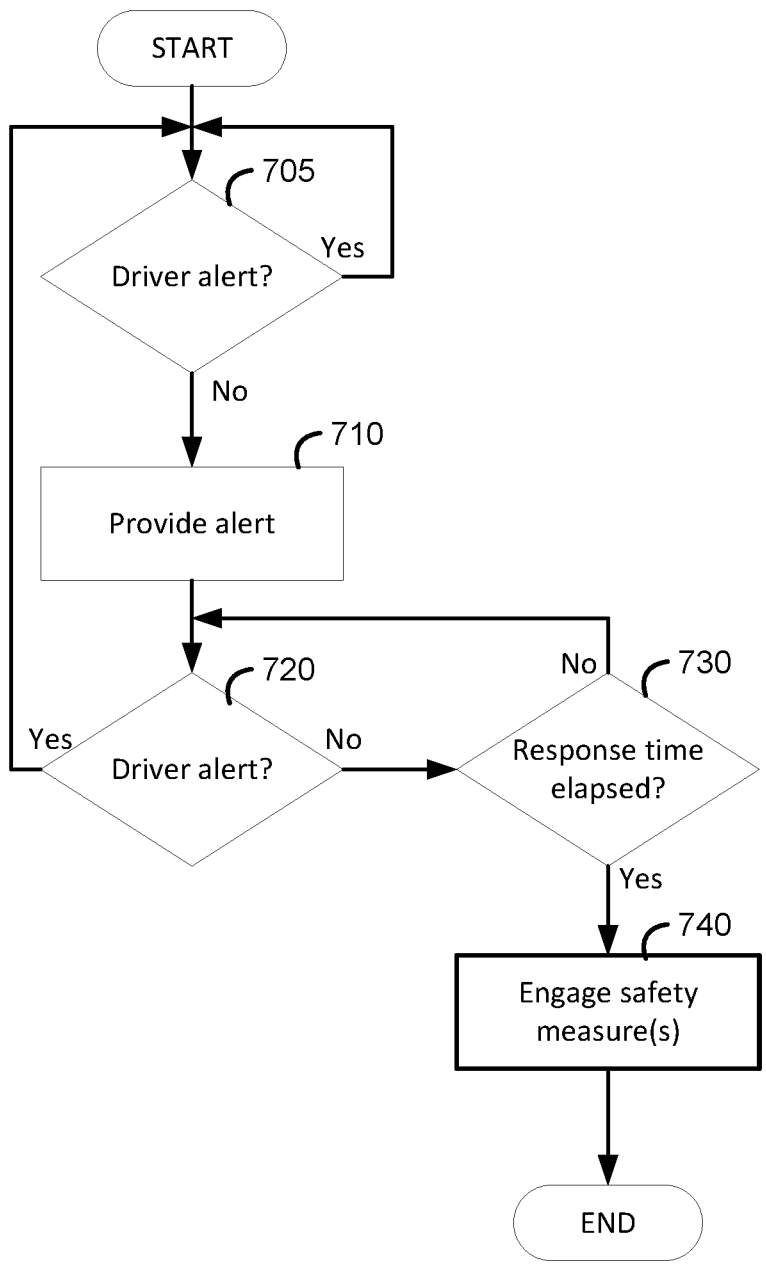
FIG. 7 is a flow diagram of a method of implementing a driver alert system, according to an embodiment.

According to embodiments, RF sensing in the manner described herein additionally or alternatively may be used to implement a driver alert system. FIG. 7 is a flow diagram of a method of implementing a driver alert system, according to an embodiment. Alternative embodiments may add, omit, rearrange, and/or otherwise alter the operations illustrated in FIG. 7. The method may be performed by a vehicle computer, such as the one illustrated in FIG. 10 and described below, and RF sensing may be performed with an RF sensing system (e.g., RF sensing system 105).

The process may begin at block 705, in which a determination is made of whether a driver of the vehicle is alert using, in part, RF sensing in the manner previously described herein. As noted, RF sensing may be capable of determining not only user dimensions, but also user positions or pose (e.g., sitting up, slumped over, etc.), head orientation, breathing pattern, and eyeball position. A determination of whether the driver is alert may be based on this obtained RF sensing data.

According to some embodiments, these determinations may be made based on comparing the RF sensing data with stored information (e.g., in a user profile for the driver) for the driver. This stored information may comprise RF sensing data obtained during an earlier calibration in which the driver provided proper user position, head orientation breathing, and eyeball position for reference, and RF sensing was performed to collect reference RF sensing data. Accordingly, in embodiments in which this reference data is used, a mismatch between RF sensing data obtained during driving with reference RF sensing data can be indicative of an inattentive or unalert driver.

According to some embodiments, RF sensing may be used in conjunction with other sensors (e.g., cameras, lane-tracking systems, steering wheel sensors, etc.) to determine whether a driver is alert. These other sensors may be used to verify user position, head orientation, breathing pattern, and/or eyeball position as detected by RF sensing. Additionally or alternatively, the sensors may be used to collect additional information indicative of whether a driver is alert. In such embodiments, a computer can determine driver alertness based on both RF sensing data and data from these additional sensors.

If the driver is not determined to be alert, the process can proceed to the operation at block 710, where an alert is provided. Here, because the driver is in the vehicle, and alert may be provided by the vehicle itself, as a message on a user interface, a light indicator, an audio sound or message, and/or the like. In some embodiments, the type or degree of messaging to the driver may vary, depending on the degree to which the driver is deemed to be unalert. For example, if the head orientation of a driver is not directed in a position indicative of an alert driver for longer than a threshold amount of time, a notification may appear in the dashboard along with a brief sound. However, if the driver is determined to be slumped over and breathing is heightened (indicative of a problematic health condition) a much more urgent message may be provided, accompanied with louder sounds and/or flashing lights.

As illustrated by blocks 720 and 730, the process can continue to determine whether a driver is alert for a given response time. This may involve additional RF sensing (an optional sensing from other sensors). If the driver's attention is restored, the process can start over. Otherwise, if the driver fails to respond (is not determined to be alert at block 720) within a response time, the process can engage one or more safety measures, as indicated at block 740.

Safety measures may vary, depending on desired functionality. Moreover, similar to the alert provided at block 710, the degree to which the safety measures are engaged maybe based at least in part on a determined state of the driver. (E.g., RF sensing and/or other data indicating severe health problems may result in much more safety measures than if the driver is simply determined to be looking away from the road for too long.) Such safety measures can include, for example, causing the vehicle to reduce its speed or stop, causing the vehicle to pull to the side of the road, and/or calling emergency services. For example, if after a driver is determined to be unalert at block 720 does not appear to be making a move for the steering wheel or applying the brake or accelerator (e.g., as determined from the driver's pose and/or other characteristics) within a respond time as determined at block 730, then the vehicle may make a determination to pull over/reduce speed or engage in additional safety measures at block 740.

Figure 8:
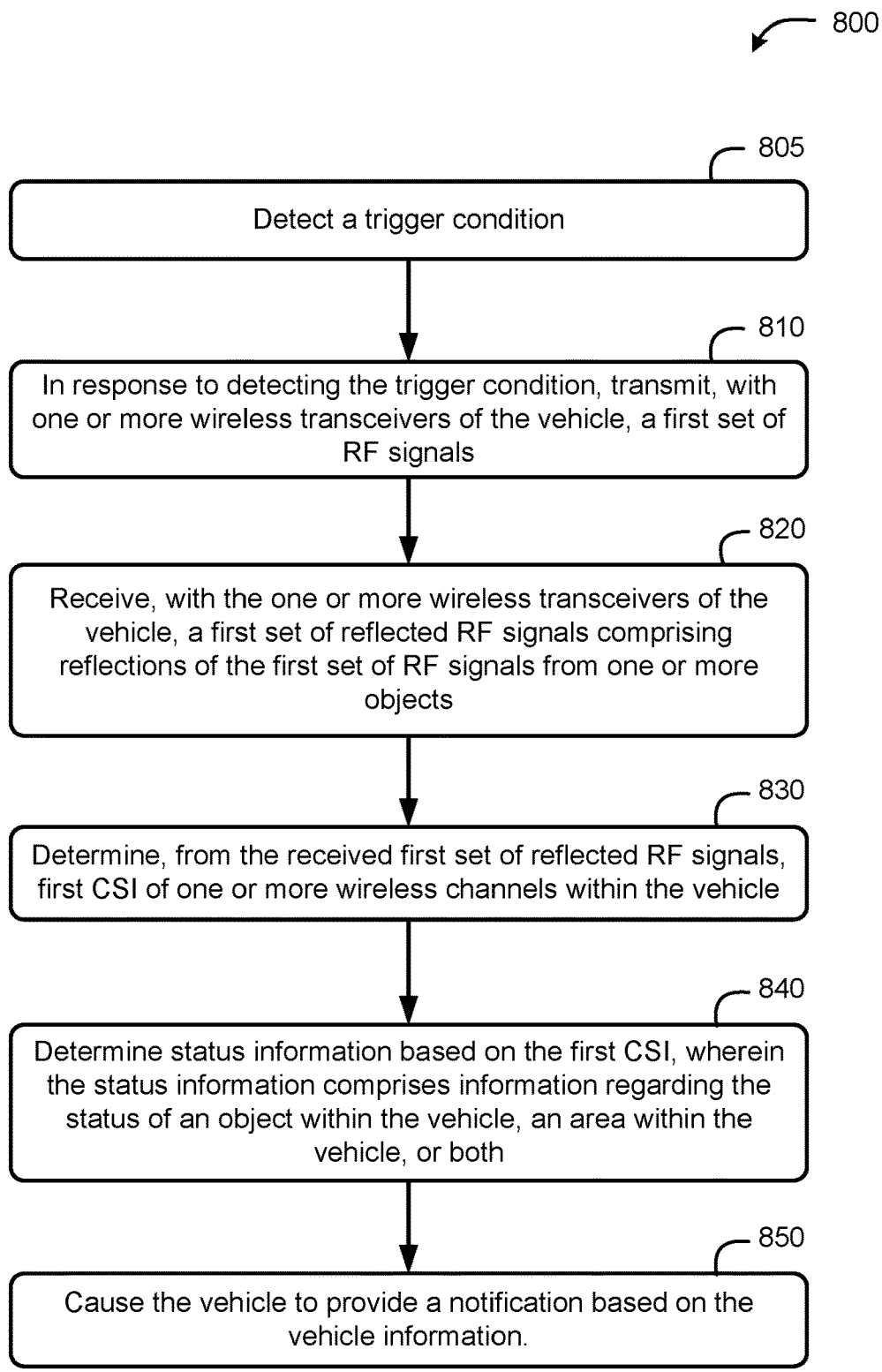
FIGS. 8 and 9 are flow diagrams illustrating methods of RF sensing in a vehicle, according to some embodiments.

FIG. 8 is a flow diagram illustrating a method 800 of RF sensing in a vehicle, according to an embodiment. The operations shown in the blocks of a FIG. 8 may be performed by a vehicle computer using an RF sensing system. An example of such a computer is illustrated in FIG. 10 and described in more detail below. Alternative embodiments may vary from the method 800 by adding, omitting, combining, and/or rearranging the operations illustrated, and/or or by performing operations simultaneously. The method 800 describes a general process of RF sensing in a vehicle, encompassing many embodiments previously described. As such, the method 800 may be considered a way in which at least some aspects of the processes illustrated in FIGS. 5-7 and described above may be implemented.

At block 805, the method comprises detecting a trigger condition. As indicated in the above-described embodiments, trigger conditions used to trigger RF sensing can vary, depending on desired functionality. Such trigger conditions can include, for example, the vehicle being turned on or off, a vehicle fob detected within the vehicle, a vehicle user entering or exiting the vehicle, arrival of the vehicle at or within a threshold distance of a POI, a request for status of a cargo area of the vehicle, or a request for status of available seats of the vehicle, or any combination thereof. Different types of vehicles (e.g., passenger, delivery, transit, etc.) may have different trigger conditions. It can be further noted that the functionality described herein as being responsive to detecting a trigger condition generally may comprise changing from one mode of RF sensing to another. For example, the detection of a trigger condition may cause a vehicle to increase a rate, frequency, or duty cycle at which RF sensing is performed.

Means for performing the functionality of block 805 may comprise processor(s) 1010, bus 1005, working memory 1035, communications subsystem 1030, wireless communications interface 1033, RF sensing system 105, and/or other components of a computer system as illustrated in FIG. 10 and described hereinafter.

At block 810, the method comprises, in response to detecting the trigger condition, transmitting, with one or more wireless transceivers of the vehicle, a first set of RF signals. As noted in the embodiments above, a vehicle may have one or more wireless transceivers, where each wireless transceiver has an RF sensing system 105 (or at least a portion thereof). The one or more wireless transceivers may comprise one or more wireless radios capable of transmitting and receiving RF signals using a WLAN standard (e.g., IEEE 802.11/Wi-Fi), and may be used by the vehicle or WLAN communication, in addition to RF sensing. RF signals may comprise communication packets utilized by the WLAN standard. As previously noted, embodiments herein may leverage existing techniques for channel estimation to obtain CSI to use for RF sensing. Additionally or alternatively, the one or more wireless transceivers may comprise UWB transceivers.

Means for performing the functionality of block 810 may comprise processor(s) 1010, bus 1005, working memory 1035, communications subsystem 1030, wireless communications interface 1033, RF sensing system 105, and/or other components of a computer system as illustrated in FIG. 10 and described hereinafter. Additional means may include Tx antenna(s) 115, Tx processing circuitry 140, Mux 135, processor 125, memory 130, and/or other components of an RF sensing system 105 as illustrated in FIG. 1 and previously described.

At block 820, the functionality comprises receiving, with one or more wireless transceivers of the vehicle, a first set of reflected RF signals comprising reflections of the first set of RF signals from one or more objects. In the case of a vehicle occupied by one or more occupants, pets, or cargo, the one or more objects may comprise the occupant(s), pet(s), or cargo. In the case of an empty vehicle, the one or more objects may simply comprise the floor or walls of the vehicle, for example, any other fixed objects in the scanned area, such as seats, steering wheel, etc.) As noted in the above embodiments, the transceiver that receives the first set of reflected RF signals may be the same transceiver that transmits the RF signals (e.g., as illustrated in FIG. 4), or may be a different transceiver (e.g., as illustrated in FIG. 2). As such, according to some embodiments of the method 800, the one or more wireless transceivers may comprise a single wireless transceiver located at a single location within the vehicle. Alternatively, a first wireless transceiver of the one or more wireless transceivers transmits the first set of RF signals, and a second wireless transceiver of the one or more wireless transceivers receives the first set of reflected RF signals, and the first wireless transceiver is located at a different location within the vehicle than the second wireless transceiver. For embodiments in which more than one transceiver is used, a vehicle computer may coordinate the transmission and reception of the RF signals. Additionally or alternatively, the transceivers may communicate with each other (e.g., in accordance with a governing wireless standard) to coordinate the transmission and reception of the RF signals.

Means for performing the functionality of block 820 may comprise processor(s) 1010, bus 1005, working memory 1035, communications subsystem 1030, wireless communications interface 1033, RF sensing system 105, and/or other components of a computer system as illustrated in FIG. 10 and described hereinafter. Additional means may include Rx antenna(s) 120, Rx processing circuitry 145, Mux 135, processor 125, memory 130, and/or other components of an RF sensing system 105 as illustrated in FIG. 1 and previously described.

The functionality at block 830 comprises determining, from the received first set of reflected RF signals, first CSI of one or more wireless channels within the vehicle. As noted, this may be determined using channel estimation techniques of a governing wireless standard for the one or more wireless transceivers that receive the reflected RF signals. As noted, reflected RF signals may be received by multiple antennas and/or at multiple times. Thus, in some embodiments, this may allow for the determination of not only the presence of motion or an object, but a direction as well. This may be dependent on how RF signals are transmitted and received (e.g., using low-resolution or high-resolution detection).

Means for performing the functionality of block 830 may comprise processor(s) 1010, bus 1005, working memory 1035, communications subsystem 1030, wireless communications interface 1033, RF sensing system 105, and/or other components of a computer system as illustrated in FIG. 10 and described hereinafter. Additional means may include processor 125, memory 130, and/or other components of an RF sensing system 105 as illustrated in FIG. 1 and previously described.

At block 840, the functionality comprises determining status information based on the first CSI, wherein the status information comprises information regarding the status of an object within the vehicle, an area within the vehicle, or both. As indicated in the previously-described embodiments, such vehicle information may include the presence of a child, adult, or pet, the availability/unavailability of a seat on the vehicle, the attentiveness of a driver or other occupant, and the like. Additionally or alternatively, the vehicle information may include the presence of an object (e.g., cargo in a cargo area, lost object in a passenger area, etc.). As such, the object described in block 840 may comprise a person, pet, cargo, etc. The area may comprise a cargo area, seat, trunk, etc. Some embodiments of the method 800 the status information comprises a detected motion or object inside the vehicle, and the trigger condition may comprise a determination that the vehicle is turned off and a driver of the vehicle is not in the vehicle. Other trigger conditions for RF sensing may include a determination of one or more other actions, such as when a passenger enters/exits, cabin temperature reaches a certain threshold, oxygen levels and/or other gas levels (e.g., CO, CO2, etc.) in the cabin reach a certain threshold, a certain amount of time has elapsed since a driver/passenger left, a driver/passenger is within a certain proximity to the vehicle, etc.

Means for performing the functionality of block 840 may comprise processor(s) 1010, bus 1005, working memory 1035, communications subsystem 1030, wireless communications interface 1033, RF sensing system 105, and/or other components of a computer system as illustrated in FIG. 10 and described hereinafter. Additional means may include processor 125, memory 130, and/or other components of an RF sensing system 105 as illustrated in FIG. 1 and previously described.

At block 850, the functionality comprises providing a response based on the status information. As indicated in the previously-described embodiments, a response may include a message, safety alert, or the like, and may be followed by safety measures and/or other actions taken at the vehicle. As indicated in the diagram of FIG. 5, an additional high-resolution object/motion detection using RF sensing may be performed after an initial low-resolution object/motion detection detects an object and/or motion. Accordingly, some embodiments of the method 800 may further comprise, in response to detecting a motion or object inside the vehicle, transmitting, with the one or more wireless transceivers of the vehicle, a second set of RF signals, and receiving, with the one or more wireless transceivers of the vehicle, the second set of reflected RF signals comprising reflections of the second set of RF signals from one or more objects within the vehicle. The method 800 may further comprise determining, from the received second set of reflected RF signals, second CSI, and determining, based on the second CSI, additional information, wherein the additional information comprises a location of the motion inside the vehicle, an identity of the object inside the vehicle, or both. In such instances, providing the response may be further based on the additional information. As indicated in the above-described embodiments, profile information may be used in the determination of an identity of an object (e.g., a child or pet). Accordingly, for some embodiments of the method 800, determining the identity of the object inside the vehicle may further comprise comparing the second CSI with stored profile information for one or more vehicle users. First and second RF signals may be transmitted according to first and second transmission modes, low- and high-resolution transmissions, for example. Thus, for some embodiments of the method 800, the first set of RF signals may be transmitted in accordance with a first transmission mode, and the second set of RF signals may be transmitted in accordance with a second transmission mode, where the second transmission mode has a shorter transmission periodicity than the first transmission mode, a larger transmission bandwidth than the first transmission mode, or a larger number of spatial streams, or any combination thereof.

Means for performing the functionality of block 850 may comprise processor(s) 1010, bus 1005, working memory 1035, communications subsystem 1030, wireless communications interface 1033, RF sensing system 105, and/or other components of a computer system as illustrated in FIG. 10 and described hereinafter. Additional means may include Tx antenna(s) 115, Tx processing circuitry 140, Mux 135, processor 125, memory 130, and/or other components of an RF sensing system 105 as illustrated in FIG. 1 and previously described.

As described in the embodiments above, techniques for RF sensing in vehicles may comprise additional variations, depending on desired functionality. For example, according to some embodiments, providing the response may comprise sending a message to a user device. As previously noted, a user device may comprise a mobile phone, although other user devices such as wearable devices, personal computers, tablets, etc. are also contemplated. Further, the method 800 may further comprise taking an action if an acknowledgment of the message is not received by a user of the user device within a threshold amount of time. Such action may include, for example, lowering a window of the vehicle, activating a heating or cooling system of the vehicle, unlocking a door of the vehicle, activating an alarm at the vehicle, or any combination thereof.

Other functionality may be taken to implement an occupant alert system. For example, where the vehicle information comprises a detected unalert occupant (e.g., driver) of the vehicle, determining the vehicle information may comprise determining one or more attributes of an occupant of the vehicle from the first CSI. Such attributes can include, for example, a sitting position of the occupant, a pose of the occupant, a head orientation of the occupant, a breathing rate of the occupant, or an eyeball position of the occupant, or any combination thereof. Determining the one or more attributes of the occupant may comprise comparing the first CSI with stored profile information regarding the occupant. Additionally or alternatively, providing a response comprises providing an alert at a user interface of the vehicle. As discussed, this alert may comprise a text or audio message, and audio notification, a dashboard indication, or the like. According to some embodiments, the method 800 may further comprise taking an action if the one or more attributes of the occupant do not change within a threshold amount of time. In such embodiments, the action may comprise causing the vehicle to reduce its speed or stop, or causing the vehicle to pull over to the side of a road, or both.

In some embodiments, initial calibration and/or set of may be performed to store user profile information that can be used in subsequent RF sensing to determine a user attribute and/or identity. This calibration may be initiated by the vehicle computer, or by an authorized vehicle user. With this in mind, some embodiments of the method 800 may further comprise, prior to transmitting the first set of RF signals, performing calibration for a vehicle user in which, while the vehicle user is inside the vehicle, a second set of RF signals are transmitted by the one or more wireless transceivers of the vehicle, a second set of reflected RF signals comprising reflections of the second set of RF signals from the vehicle user are received by the one or more wireless transceivers of the vehicle, first set of RF signals, second CSI is determined from the second set of reflected RF signals, one or more user attributes of the vehicle user are determined based at least in part on the second CSI, and the one or more user attributes are stored in a user profile. Again, these user attributes may comprise user dimensions, a sitting position of the user, a pose of the user (e.g., position of torso and/or legs, arms, hands, feet, etc.), a head orientation of the user, a breathing rate of the user, and/or an eyeball position (including an eye/iris tracking output, for example) of the user.

Figure 9:
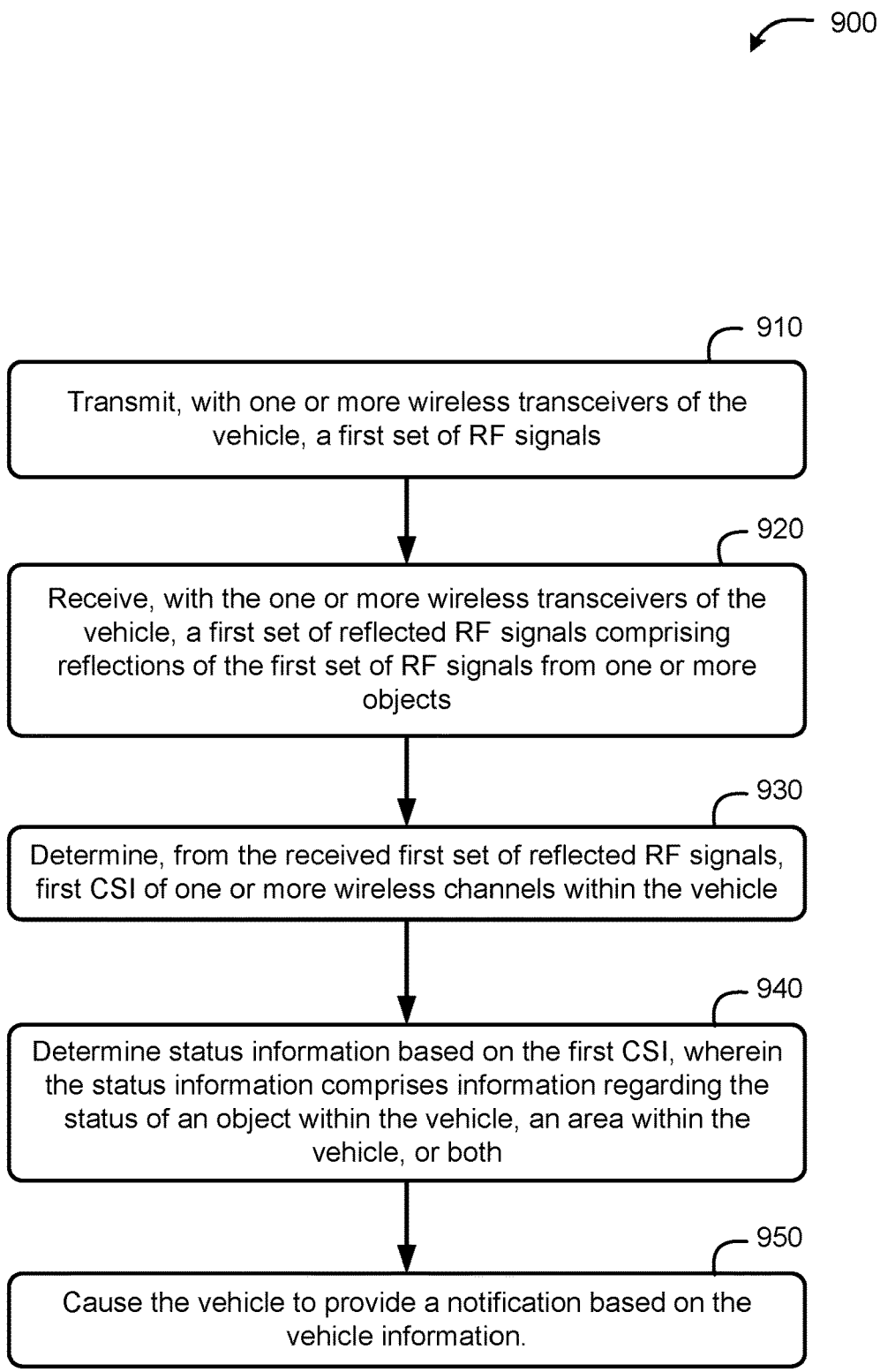

FIG. 9 is a flow diagram illustrating a method 900 of RF sensing in a vehicle, according to another embodiment. As can be seen, the operations in method 900 are generally similar to those in method 800 of FIG. 8. Moreover, operations 910-950 may be performed in a manner similar to corresponding operations 810-850 in FIG. 8 and described above. FIG. 9 does not, however, include the detection of and response to a trigger condition, to further emphasize that, according to some embodiments, these operations may be initiated under any of a wide variety of conditions. Similar to FIG. 8, the operations shown in the blocks of a FIG. 9 may be performed by a vehicle computer using an RF sensing system.

FIG. 10 is a block diagram of an embodiment of a vehicle computer 1000, which may incorporate an RF sensing system 105 that can be operated in the manner discussed in the previously-described embodiments. As noted, an RF sensing system 105 may be included in each of one or more wireless transceivers, which may be incorporated into one or more subsystems of the vehicle computer, such as the wireless communications interface 1033. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be located at different physical locations of a vehicle.

The vehicle computer 1000 is shown comprising hardware elements that can be electrically coupled via a bus 1005 (or may otherwise be in communication, as appropriate). The hardware elements may include processor(s) 1010, which can include without limitation one or more general-purpose processors, one or more special-purpose processors (such as a DSP, graphics processing unit (GPU), application-specific integrated circuit (ASIC), field-programmable gate array (FPGA), and/or the like), and/or other processing structure, unit, or means, which can be configured to perform one or more of the methods described herein, including the method described in relation to FIG. 8 and/or the processes described in FIGS. 5-7. The vehicle computer 1000 also can include one or more input devices 1015, which can include without limitation a mouse, a keyboard, a camera, a microphone, a touchscreen, sensor, electronic subsystem of the vehicle (e.g., controlling breaking, steering, navigation, heating, cooling, etc.), and/or the like; and one or more output devices 1020, which can include without limitation a display device, a speaker, electronic subsystem of the vehicle, and/or the like.

The vehicle computer 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device (such as a random access memory (RAM) and/or a read-only memory (ROM)), which can be programmable, flash-updateable, and/or the like. Such storage devices may be configured to implement any appropriate data stores, including without limitation, various file systems, database structures, and/or the like.

The vehicle computer 1000 may also include a communications subsystem 1030, which can include support of wireline communication technologies and/or wireless communication technologies (in some embodiments) managed and controlled by a wireless communication interface 1033. The communications subsystem 1030 may include a modem, a network card (wireless or wired), an infrared communication device, a wireless communication device, and/or a chipset, and/or the like. The communications subsystem 1030 may include one or more input and/or output communication interfaces, such as the wireless communication interface 1033, to permit data and signaling to be exchanged with a network, mobile devices, other computer systems, and/or any other electronic devices described herein. As previously noted, an RF sensing system 105 (as illustrated in FIG. 1) may be incorporated into a wireless communications interface 1033 such that Tx antenna(s) 115 and Rx antenna(s) 120, and the circuitry connected with the antenna elements (e.g., the other components of the RF sensing system 105), may be used for both RF sensing and data communication. For example, in some embodiments, the wireless communication interface 1033 may comprise an 802.11ad-compatible and/or 802.11ay-compatible modem capable of both RF sensing and data communication. Aspects of the wireless communication interface 1033 having an RF sensing system 105 may correspond to transceivers illustrated in FIGS. 2 and 4 and described elsewhere herein.

As noted, some embodiments may have an RF sensing system 105 that is not used for wireless communication. In such instances, the RF sensing system 105 may be incorporated elsewhere within the vehicle computer 1000. In some embodiments, for example, the RF sensing system 105 may be incorporated into the vehicle computer 1000 as an input device 1015. Other sensors, too, may be included as input devices 1015.

In many embodiments, the vehicle computer 1000 will further comprise a working memory 1035, which can include a RAM and/or or ROM device. Software elements, shown as being located within the working memory 1035, can include an operating system 1040, device drivers, executable libraries, and/or other code, such as application(s) 1045, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 7 and 10, may be implemented as code and/or instructions that are stored (e.g. temporarily) in working memory 1035 and are executable by a computer (and/or a processor within a computer such as processor(s) 1010); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as vehicle computer 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the vehicle computer 1000 and/or might take the form of source and/or installable code, which, upon compilation and/or installation on the vehicle computer 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of RF sensing in a vehicle, the method comprising:
transmitting, with one or more wireless transceivers of the vehicle, a first set of RF signals;
receiving, with the one or more wireless transceivers of the vehicle, a first set of reflected RF signals comprising reflections of the first set of RF signals from one or more objects;
determining, from the received first set of reflected RF signals, first channel state information (CSI) of one or more wireless channels within the vehicle;
determining status information based on the first CSI, wherein the status information comprises information regarding the status of an object within the vehicle, an area within the vehicle, or both; and
providing a response based on the status information.

Clause 2: The method of clause 1, wherein: transmitting the first set of RF signals is in response to detecting a trigger condition, status information comprises a detected motion or object inside the vehicle, and the trigger condition comprises a determination that the vehicle is turned off and a driver of the vehicle is not in the vehicle.

Clause 3: The method of clause 2, further comprising, in response to detecting the motion or object inside the vehicle:
transmitting, with the one or more wireless transceivers of the vehicle, a second set of RF signals,
receiving, with the one or more wireless transceivers of the vehicle, a second set of reflected RF signals comprising reflections of the second set of RF signals from the one or more objects within the vehicle;
determining, from the received second set of RF signals, second CSI; and
determining, based on the second CSI, additional information, wherein the additional information comprises:
a location of the motion inside the vehicle,
an identity of the object inside the vehicle, or both;
wherein providing the response is further based on the additional information.

Clause 4: The method of clause 3, wherein determining the identity of the object inside the vehicle further comprises comparing the second CSI with stored profile information for one or more vehicle users.

Clause 5: The method of clause 3 or 4, wherein:
the first set of RF signals are transmitted in accordance with a first transmission mode; and the second set of RF signals are transmitted in accordance with a second transmission mode, wherein the second transmission mode has:
a shorter transmission periodicity than the first transmission mode,
a larger transmission bandwidth than the first transmission mode, or
a larger number of spatial streams, or
any combination thereof.

Clause 6: The method of any of clauses 2-5, wherein providing a response comprises sending a message to a user device.

Clause 7: The method of clause 6, further comprising taking an action if an acknowledgment of the message is not received by a user of the user device within a threshold amount of time, wherein the action comprises:
lowering a window of the vehicle,
activating a heating or cooling system of the vehicle,
unlocking a door of the vehicle, or
activating an alarm at the vehicle, or
any combination thereof.

Clause 8: The method of clause 1, wherein status information comprises a detected unalert occupant of the vehicle, and determining the status information comprises determining one or more attributes of an occupant of the vehicle from the first CSI, wherein the one or more attributes comprise:
a sitting position of the occupant,
a pose of the occupant,
a head orientation of the occupant,
a breathing rate of the occupant, or
an eyeball position of the occupant, or
any combination thereof.

Clause 9: The method of clause 8, wherein determining the one or more attributes of the occupant comprises comparing the first CSI with stored profile information regarding the occupant.

Clause 10: The method of any of clauses 1-9, wherein providing a response comprises providing an alert at a user interface of the vehicle.

Clause 11: The method of any of clauses 8-10, further comprising taking an action if the one or more attributes of the occupant do not change within a threshold amount of time, wherein the action comprises:
causing the vehicle to reduce its speed or stop, or
causing the vehicle to pull over to a side of a road, or both.

Clause 12: The method of any of clauses 1-11, further comprising, prior to transmitting the first set of RF signals, performing calibration for a vehicle user in which, while the vehicle user is inside the vehicle:
a second set of RF signals are transmitted by the one or more wireless transceivers of the vehicle;
a second set of reflected RF signals comprising reflections of the second set of RF signals from the vehicle user are received by the one or more wireless transceivers of the vehicle;
second CSI is determined from the received second set of reflected RF signals;
one or more user attributes of the vehicle user are determined based at least in part on the second CSI; and
the one or more user attributes are stored in a user profile.

Clause 13: The method of any of clauses 1-12, wherein the one or more wireless transceivers comprise a single wireless transceiver located at a single location within the vehicle.

Clause 14: The method of any of clauses 1-12, a first wireless transceiver of the one or more wireless transceivers transmits the first set of RF signals, and a second wireless transceiver of the one or more wireless transceivers receives the first set of reflected RF signals, and wherein the first wireless transceiver is located at a different location within the vehicle than the second wireless transceiver.

Clause 15: The method of any of clauses 1-14, wherein the one or more wireless transceivers comprise one or more Wireless Local Area Network (WLAN) or Wi-Fi transceivers.

Clause 16: The method of any of clauses 1-15, wherein transmitting the first set of RF signals is in response to detecting a trigger condition, and the trigger condition comprises:
the vehicle being turned on or off,
a vehicle fob detected within the vehicle,
a vehicle user entering or exiting the vehicle,
a vehicle user no longer being within a threshold distance of the vehicle,
arrival of the vehicle at or within a threshold distance of a point of interest (POI),
a request for status of a cargo area of the vehicle, or
a request for status of available seats of the vehicle, or
any combination thereof.

Clause 17: A device for providing RF sensing in a vehicle, the device comprising:
one or more wireless transceivers;
a memory; and
one or more processors communicatively coupled with one or more wireless transceivers and the memory and configured to:
transmit, via the one or more wireless transceivers, a first set of RF signals;
receive, via the one or more wireless transceivers, a first set of reflected RF signals comprising reflections of the first set of RF signals from one or more objects;
determine, from the received first set of reflected RF signals, first channel state information (CSI) of one or more wireless channels within the vehicle;
determine status information based on the first CSI, the status information comprising information regarding an object within the vehicle, an area within the vehicle, or both; and
provide a response based on the status information.

Clause 18: The device of clause 17, wherein the one or more processors are configured to transmit the first set of RF signals in response to detecting a trigger condition comprising a determination that the vehicle is turned off and a driver of the vehicle is not in the vehicle, and to determine the status information, the one or more processors are configured to determine a detected motion or object inside the vehicle.

Clause 19: The device of clause 18, wherein the one or more processors are further configured to, in response to detecting the motion or object inside the vehicle:
transmit, via the one or more wireless transceivers of the vehicle, a second set of RF signals,
receive, via the one or more wireless transceivers of the vehicle, a second set of reflected RF signals comprising reflections of the second set of RF signals from the one or more objects within the vehicle;

determine, from the received second set of reflected RF signals, second CSI; and determine, based on the second CSI, additional information, wherein the additional information comprises:

a location of the motion inside the vehicle, an identity of the object inside the vehicle, or both;

wherein providing the response is further based on the additional information.

Clause 20: The device of clause 19, wherein, to determine the identity of the object inside the vehicle, the one or more processors are configured to compare the second CSI with stored profile information for one or more vehicle users.

Clause 21: The device of clause 19 or 20, wherein the one or more processors are configured to cause the one or more wireless transceivers to:

transmit the first set of RF signals in accordance with a first transmission mode; and transmit the second set of RF signals in accordance with a second transmission mode, wherein the second transmission mode has:

a shorter transmission periodicity than the first transmission mode, a larger transmission bandwidth than the first transmission mode, or a larger number of spatial streams, or any combination thereof.

Clause 22: The device of any of clauses 18-21, wherein, to provide a response the one or more processors are configured to send a message, via the one or more wireless transceivers, to a user device.

Clause 23: The device of clause 22, wherein the one or more processors are configured to take an action if an acknowledgment of the message is not received by a user of the user device within a threshold amount of time, wherein the action comprises:

lowering a window of the vehicle, activating a heating or cooling system of the vehicle, unlocking a door of the vehicle, or activating an alarm at the vehicle, or any combination thereof.

Clause 24: The device of clause 17, wherein the one or more processors are configured to determine the status information comprising a detected an unalert occupant, and wherein, to detect the unalert occupant, the one or more processors are configured to determine one or more attributes of an occupant of the vehicle from the first CSI, wherein the one or more attributes comprise:

a sitting position of the occupant, a pose of the occupant, a head orientation of the occupant, a breathing rate of the occupant, or an eyeball position of the occupant, or any combination thereof.

Clause 25: The device of clause 24, wherein, to determine the one or more attributes of the occupant, the one or more processors are configured to compare the first CSI with stored profile information regarding the occupant.

Clause 26: The device any of clauses 17-25, wherein, to provide a response, the one or more processors are configured to provide an alert at a user interface of the vehicle.

Clause 27: The device of any of clauses 24-26, wherein the one or more processors are configured to take an action if the one or more attributes of the occupant do not change within a threshold amount of time, wherein the action comprises:

causing the vehicle to reduce its speed or stop, or causing the vehicle to pull over to a side of a road, or both.

Clause 28: The device of any of clauses 17-27, wherein the one or more processors are configured to, prior to transmitting the first set of RF signals via the one or more wireless transceivers, cause a calibration for a vehicle user to be performed in which, while the vehicle user is inside the vehicle, the one or more processors are configured to:

transmit a second set of RF signals via the one or more wireless transceivers;

receive, via the one or more wireless transceivers, a second set of reflected RF signals comprising reflections of the second set of RF signals from the vehicle user;

determine second CSI from the received second set of reflected RF signals;

determine one or more user attributes of the vehicle user based at least in part on the second CSI; and store, in the memory, the one or more user attributes in a user profile.

Clause 29: The device of any of clauses 17-28, wherein the one or more wireless transceivers comprise a single wireless transceiver located at a single location within the vehicle.

Clause 30: The device of any of clauses 17-28, a first wireless transceiver of the one or more wireless transceivers is configured to transmit the first set of RF signals, and a second wireless transceiver of the one or more wireless transceivers is configured to receive the first set of reflected RF signals, and wherein the first wireless transceiver is located at a different location within the vehicle than the second wireless transceiver.

Clause 31: The device of any of clauses 17-30, wherein the one or more wireless transceivers comprise one or more Wireless Local Area Network (WLAN) or Wi-Fi transceivers.

Clause 32: The device of any of clauses 17-31, wherein, the one or more processors are configured to transmit the first set of RF signals in response to detecting a trigger condition comprising:

the vehicle being turned on or off, a vehicle fob detected within the vehicle, a vehicle user entering or exiting the vehicle, a vehicle user no longer being within a threshold distance of the vehicle, arrival of the vehicle at or within a threshold distance of a point of interest (POI), a request for status of a cargo area of the vehicle, or a request for status of available seats of the vehicle, or any combination thereof.

Clause 33: A RF sensing device for a vehicle, the device comprising:

means for transmitting a first set of RF signals;

means for receiving a first set of reflected RF signals comprising reflections of the first set of RF signals from one or more objects;

means for determining, from the received first set of reflected RF signals, first channel state information (CSI) of one or more wireless channels within the vehicle;

means for determining status information based on the first CSI, the status information comprising information regarding an object within the vehicle, an area within the vehicle, or both; and means for providing a response based on the status information.

Clause 34: The device of clause 33, wherein the means for determining status information based on the first CSI comprises means for detecting motion or object inside the vehicle, and the means for detecting the trigger condition comprises means for determining that the vehicle is turned off and a driver of the vehicle is not in the vehicle.

Clause 35: The device of clause 34, further comprising, means for performing the following operations in response to detecting the motion or object inside the vehicle:
transmitting a second set of RF signals,
receiving a second set of reflected RF signals comprising reflections of the second set of RF signals from the one or more objects within the vehicle;
determining, from the received second set of reflected RF signals, second CSI; and
determining, based on the second CSI, additional information, wherein the additional information comprises:
a location of the motion inside the vehicle,
an identity of the object inside the vehicle, or
both;
wherein the means for providing the response are configured to provide the response further based on the additional information.

Clause 36: The device of clause 35, wherein the means for transmitting a first set of RF signals are configured to:
transmit the first set of RF signals in accordance with a first transmission mode; and
transmit the second set of RF signals in accordance with a second transmission mode, wherein the second transmission mode has:
a shorter transmission periodicity than the first transmission mode,
a larger transmission bandwidth than the first transmission mode, or
a larger number of spatial streams, or
any combination thereof.

Clause 37: The device of clause 33, wherein the means for determining status information based on the first CSI comprises means for detecting an unalert occupant of the vehicle based on determining one or more attributes of an occupant of the vehicle from the first CSI, wherein the one or more attributes comprise:
a sitting position of the occupant,
a pose of the occupant,
a head orientation of the occupant,
a breathing rate of the occupant, or
an eyeball position of the occupant, or
any combination thereof.

Clause 38. The device of clause 33, further comprising means for performing calibration for a vehicle user prior to transmitting the first set of RF signals, wherein the means for performing calibration comprises means for performing the following operations while the vehicle user is inside the vehicle:
transmitting a second set of RF signals;
receiving a second set of reflected RF signals comprising reflections of the second set of RF signals from the vehicle user;
determining second CSI from the received second set of reflected RF signals;
determining one or more user attributes of the vehicle user based at least in part on the second CSI; and
storing the one or more user attributes in a user profile.

Clause 39: The device of any of clauses 33-38, wherein a single wireless transceiver located at a single location within the vehicle comprises the means for transmitting the first set of RF signals and the means for receiving the first set of reflected RF signals.

Clause 40: A non-transitory computer-readable medium having instructions stored thereby for RF sensing in a vehicle, wherein the instructions, when executed by one or more processors, cause the one or more processors to perform the method of any one of clauses 1-16.

What is claimed is:

1. A method of radio frequency (RF) sensing in a vehicle, the method comprising:
transmitting, with one or more wireless transceivers of the vehicle, a first set of RF signals in accordance with a first transmission mode;
receiving, with the one or more wireless transceivers of the vehicle, a first set of reflected RF signals comprising reflections of the first set of RF signals from one or more objects;
determining, from the received first set of reflected RF signals, first channel state information (CSI) of one or more wireless channels within the vehicle;
determining status information based on the first CSI, wherein the status information comprises information regarding a detected motion or a detected object within the vehicle;
in response to detecting the motion or object inside the vehicle, transmitting a second set of RF signals with the one or more wireless transceivers of the vehicle, wherein the second set of RF signals are transmitted in accordance with a second transmission mode, wherein the second transmission mode has:
a larger transmission bandwidth than the first transmission mode,
a larger number of spatial streams than the first transmission mode, or
both;
receiving, with the one or more wireless transceivers of the vehicle, a second set of reflected RF signals comprising reflections of the second set of RF signals from the one or more objects within the vehicle;
determining, from the received second set of reflected RF signals, second CSI;
determining, based on the second CSI, additional information, wherein the additional information comprises:
a location of the motion inside the vehicle,
an identity of the object inside the vehicle, or
both; and
providing a response based on the status information and the additional information.

2. The method of claim 1, wherein:
transmitting the first set of RF signals is in response to detecting a trigger condition,
and
the trigger condition comprises a determination that the vehicle is turned off and a driver of the vehicle is not in the vehicle.

3. The method of claim 1, wherein determining the identity of the object inside the vehicle further comprises comparing the second CSI with stored profile information for one or more vehicle users.

4. The method of claim 1, wherein providing a response comprises sending a message to a user device.

5. The method of claim 4, further comprising taking an action if an acknowledgment of the message is not received by a user of the user device within a threshold amount of time, wherein the action comprises:
  lowering a window of the vehicle,
  activating a heating or cooling system of the vehicle,
  unlocking a door of the vehicle, or
  activating an alarm at the vehicle, or
  any combination thereof.

6. The method of claim 1, further comprising, prior to transmitting the first set of RF signals, performing calibration for a vehicle user in which, while the vehicle user is inside the vehicle:
  a third set of RF signals are transmitted by the one or more wireless transceivers of the vehicle;
  a third set of reflected RF signals comprising reflections of the third set of RF signals from the vehicle user are received by the one or more wireless transceivers of the vehicle;
  third CSI is determined from the received third set of reflected RF signals;
  one or more user attributes of the vehicle user are determined based at least in part on the third CSI; and
  the one or more user attributes are stored in a user profile.

7. The method of claim 1, wherein the one or more wireless transceivers comprise a single wireless transceiver located at a single location within the vehicle.

8. The method of claim 1, a first wireless transceiver of the one or more wireless transceivers transmits the first set of RF signals, and a second wireless transceiver of the one or more wireless transceivers receives the first set of reflected RF signals, and wherein the first wireless transceiver is located at a different location within the vehicle than the second wireless transceiver.

9. The method of claim 1, wherein the one or more wireless transceivers comprise one or more Wireless Local Area Network (WLAN) or Wi-Fi transceivers.

10. The method of claim 1, wherein transmitting the first set of RF signals is in response to detecting a trigger condition, and the trigger condition comprises:
  the vehicle being turned on or off,
  a vehicle fob detected within the vehicle,
  a vehicle user entering or exiting the vehicle,
  a vehicle user no longer being within a threshold distance of the vehicle,
  arrival of the vehicle at or within a threshold distance of a point of interest (POI),
  a request for status of a cargo area of the vehicle, or
  a request for status of available seats of the vehicle, or
  any combination thereof.

11. The method of claim 1, wherein status information further comprises a number of detected occupants of the vehicle.

12. A device for providing radio frequency (RF) sensing in a vehicle, the device comprising:
  one or more wireless transceivers;
  a memory; and
  one or more processors communicatively coupled with one or more wireless transceivers and the memory and configured to:
    transmit, via the one or more wireless transceivers, a first set of RF signals in accordance with a first transmission mode;
    receive, via the one or more wireless transceivers, a first set of reflected RF signals comprising reflections of the first set of RF signals from one or more objects;
    determine, from the received first set of reflected RF signals, first channel state information (CSI) of one or more wireless channels within the vehicle;
    determine status information based on the first CSI, the status information comprising information regarding a detected motion or a detected object within the vehicle;
    in response to detecting the motion or object inside the vehicle, transmit a second set of RF signals via the one or more wireless transceivers in accordance with a second transmission mode, wherein the second transmission mode has:
      a larger transmission bandwidth than the first transmission mode,
      a larger number of spatial streams than the first transmission mode, or
      both;
    receive, via the one or more wireless transceivers, a second set of reflected RF signals comprising reflections of the second set of RF signals from the one or more objects within the vehicle;
    determine, from the received second set of reflected RF signals, second CSI;
    determine, based on the second CSI, additional information, wherein the additional information comprises:
      a location of the motion inside the vehicle,
      an identity of the object inside the vehicle, or
      both; and
    provide a response based on the status information and the additional information.

13. The device of claim 12, wherein:
  the one or more processors are configured to transmit the first set of RF signals in response to detecting a trigger condition comprising a determination that the vehicle is turned off and a driver of the vehicle is not in the vehicle.

14. The device of claim 12, wherein, to determine the identity of the object inside the vehicle, the one or more processors are configured to compare the second CSI with stored profile information for one or more vehicle users.

15. The device of claim 12, wherein, to provide a response, the one or more processors are configured to send a message, via the one or more wireless transceivers, to a user device.

16. The device of claim 15, wherein the one or more processors are configured to take an action if an acknowledgment of the message is not received by a user of the user device within a threshold amount of time, wherein the action comprises:
  lowering a window of the vehicle,
  activating a heating or cooling system of the vehicle,
  unlocking a door of the vehicle, or
  activating an alarm at the vehicle, or
  any combination thereof.

17. The device of claim 12, wherein the one or more processors are configured to, prior to transmitting the first set of RF signals via the one or more wireless transceivers, cause a calibration for a vehicle user to be performed in which, while the vehicle user is inside the vehicle, the one or more processors are configured to:
  transmit a third set of RF signals via the one or more wireless transceivers;

receive, via the one or more wireless transceivers, a third set of reflected RF signals comprising reflections of the third set of RF signals from the vehicle user;

determine third CSI from the received third set of reflected RF signals;

determine one or more user attributes of the vehicle user based at least in part on the third CSI; and store, in the memory, the one or more user attributes in a user profile.

18. The device of claim 12, wherein the one or more wireless transceivers comprise a single wireless transceiver located at a single location within the vehicle.

19. The device of claim 12, a first wireless transceiver of the one or more wireless transceivers is configured to transmit the first set of RF signals, and a second wireless transceiver of the one or more wireless transceivers is configured to receive the first set of reflected RF signals, and wherein the first wireless transceiver is located at a different location within the vehicle than the second wireless transceiver.

20. The device of claim 12, wherein the one or more wireless transceivers comprise one or more Wireless Local Area Network (WLAN) or Wi-Fi transceivers.

21. The device of claim 12, wherein the one or more processors are configured to transmit the first set of RF signals in response to detecting a trigger condition comprising:

the vehicle being turned on or off,
a vehicle fob detected within the vehicle,
a vehicle user entering or exiting the vehicle,
a vehicle user no longer being within a threshold distance of the vehicle,
arrival of the vehicle at or within a threshold distance of a point of interest (POI),
a request for status of a cargo area of the vehicle, or
a request for status of available seats of the vehicle, or
any combination thereof.

22. The device of claim 12, wherein the one or more processors are configured to include, in the status information, a number of detected occupants of the vehicle.

23. A radio frequency (RF) sensing device for a vehicle, the device comprising:

means for transmitting a first set of RF signals in accordance with a first transmission mode;

means for receiving a first set of reflected RF signals comprising reflections of the first set of RF signals from one or more objects;

means for determining, from the received first set of reflected RF signals, first channel state information (CSI) of one or more wireless channels within the vehicle;

means for determining status information based on the first CSI, the status information comprising information regarding a detected motion or a detected object within the vehicle;

means for transmitting a second set of RF signals in response to detecting the motion or object inside the vehicle, wherein the second set of RF signals are transmitted in accordance with a second transmission mode, wherein the second transmission mode has:

a larger transmission bandwidth than the first transmission mode,
a larger number of spatial streams than the first transmission mode, or
both;

means for receiving a second set of reflected RF signals comprising reflections of the second set of RF signals from the one or more objects within the vehicle;

means for determining, from the received second set of reflected RF signals, second CSI;

means for determining, based on the second CSI, additional information, wherein the additional information comprises:

a location of the motion inside the vehicle,
an identity of the object inside the vehicle, or
both; and means for providing a response based on the status information and the additional information.

24. A non-transitory computer-readable medium having instructions stored thereby for radio frequency (RF) sensing in a vehicle, wherein the instructions, when executed by one or more processors, cause the one or more processors to perform functions including:

transmitting, with one or more wireless transceivers of the vehicle, a first set of RF signals in accordance with a first transmission mode;

receiving, with the one or more wireless transceivers of the vehicle, a first set of reflected RF signals comprising reflections of the first set of RF signals from one or more objects;

determining, from the received first set of reflected RF signals, first channel state information (CSI) of one or more wireless channels within the vehicle;

determining status information based on the first CSI, the status information comprising information regarding a detected motion or a detected object within the vehicle;

in response to detecting the motion or object inside the vehicle, transmitting a second set of RF signals with the one or more wireless transceivers of the vehicle, wherein the second set of RF signals are transmitted in accordance with a second transmission mode, wherein the second transmission mode has:

a larger transmission bandwidth than the first transmission mode,
a larger number of spatial streams than the first transmission mode, or
both;

receiving, with the one or more wireless transceivers of the vehicle, a second set of reflected RF signals comprising reflections of the second set of RF signals from the one or more objects within the vehicle;

determining, from the received second set of reflected RF signals, second CSI;

determining, based on the second CSI, additional information, wherein the additional information comprises:

a location of the motion inside the vehicle,
an identity of the object inside the vehicle, or
both; and providing a response based on the status information and the additional information.

* * * * *